(12) United States Patent
Vakilimoghaddam et al.

(10) Patent No.: US 11,371,782 B2
(45) Date of Patent: Jun. 28, 2022

(54) HEAT EXCHANGER WITH PARALLEL FLOW FEATURES TO ENHANCE HEAT CONDUCTION

(71) Applicant: Dana Canada Corporation, Oakville (CA)

(72) Inventors: Farbod Vakilimoghaddam, Oakville (CA); Noman Rahim, Brampton (CA); Allan K. So, Mississauga (CA); Lee M. Kinder, Oakville (CA); Michael Bardeleben, Oakville (CA); Benjamin A. Kenney, Toronto (CA)

(73) Assignee: Dana Canada Corporation, Oakville (CA)

( * ) Notice: Subject to any disclaimer, the term of this patent is extended or adjusted under 35 U.S.C. 154(b) by 0 days.

(21) Appl. No.: 17/262,174

(22) PCT Filed: May 30, 2019

(86) PCT No.: PCT/CA2019/050745
§ 371 (c)(1),
(2) Date: Jan. 21, 2021

(87) PCT Pub. No.: WO2020/019058
PCT Pub. Date: Jan. 30, 2020

(65) Prior Publication Data
US 2021/0247145 A1    Aug. 12, 2021

Related U.S. Application Data

(60) Provisional application No. 62/719,266, filed on Aug. 17, 2018, provisional application No. 62/703,734, filed on Jul. 26, 2018.

(51) Int. Cl.
*F28D 9/00* (2006.01)
*H01M 10/613* (2014.01)
(Continued)

(52) U.S. Cl.
CPC ............ *F28D 9/0037* (2013.01); *F28F 3/12* (2013.01); *H01M 10/613* (2015.04);
(Continued)

(58) Field of Classification Search
CPC ...... F28D 9/0037; F28D 1/0341; F28D 1/035; H01M 10/613; H01M 10/625;
(Continued)

(56) References Cited

U.S. PATENT DOCUMENTS

| 4,478,277 A | 10/1984 | Friedman et al. |
| 4,953,634 A | 9/1990 | Nelson et al. |

(Continued)

OTHER PUBLICATIONS

ISA Canadian Intellectual Property Office, International Search and Written Opinion Issued in Application No. PCT/CA2019/050745, dated Aug. 15, 2019, WIPO, 10 pages.

*Primary Examiner* — Len Tran
*Assistant Examiner* — Gustavo A Hincapie Serna
(74) *Attorney, Agent, or Firm* — McCoy Russell LLP

(57) ABSTRACT

A cold plate heat exchanger for battery thermal management has first and second plates defining a plurality of fluid flow passages, with inlet and outlet ports proximate to a first end thereof. Each fluid flow passage has first and second ends communicating with respective inlet and outlet ports. One or more portions of each fluid flow passage are immediately adjacent to and in close proximity to a portion of another fluid flow passage or channel, such that heat energy will be transferred by conduction through the first and second plates between the fluid flow passages or channels, thereby providing enhanced heat transfer. The fluid flow passages or channels may be separated by a distance which is less than a width of one of the fluid flow passages or channels, and may be separated by a single rib which partially defines each of the fluid flow passages or channels.

20 Claims, 18 Drawing Sheets

(51) Int. Cl.
*H01M 10/625* (2014.01)
*H01M 10/6554* (2014.01)
*H01M 10/6556* (2014.01)
*F28F 3/12* (2006.01)

(52) U.S. Cl.
CPC ..... *H01M 10/625* (2015.04); *H01M 10/6554* (2015.04); *H01M 10/6556* (2015.04); *H01M 2220/20* (2013.01)

(58) Field of Classification Search
CPC ......... H01M 10/6554; H01M 10/6556; H01M 2220/20; F28F 3/12; F28F 3/044; F28F 3/08; Y02E 60/10; Y02T 10/70; B60L 58/26
USPC ......................................................... 165/166
See application file for complete search history.

(56) References Cited

U.S. PATENT DOCUMENTS

| | | | |
|---|---|---|---|
| 5,287,919 A * | 2/1994 | George, II | F28F 3/12 |
| | | | 165/170 |
| 5,644,840 A | 7/1997 | Hisamori et al. | |
| RE35,890 E | 9/1998 | So | |
| 6,273,183 B1 | 8/2001 | So et al. | |
| 6,503,653 B2 * | 1/2003 | Rock | H01M 8/0228 |
| | | | 429/434 |
| 6,866,955 B2 | 3/2005 | Lee et al. | |
| 7,588,074 B1 | 9/2009 | White | |
| 7,851,080 B2 | 12/2010 | Weber et al. | |
| 7,891,415 B2 | 2/2011 | Ushio et al. | |
| 8,157,000 B2 | 4/2012 | Johnston | |
| 8,327,924 B2 | 12/2012 | Muley et al. | |
| 8,418,365 B2 | 4/2013 | German et al. | |
| 8,567,487 B2 | 10/2013 | Christensen et al. | |
| 8,776,869 B2 | 7/2014 | Barnes et al. | |
| 8,835,039 B2 | 9/2014 | Teng et al. | |
| 9,033,030 B2 | 5/2015 | Des Champs | |
| 9,437,905 B2 * | 9/2016 | Boddakayala | B60L 58/27 |
| 9,766,015 B2 | 9/2017 | Matsuura et al. | |
| 10,006,722 B2 * | 6/2018 | Kenney | H01M 10/613 |
| 10,158,151 B2 * | 12/2018 | Kenney | F28F 3/12 |
| 10,263,301 B2 * | 4/2019 | Kenney | F28F 1/022 |
| 10,355,331 B2 * | 7/2019 | Kenney | H01M 10/613 |
| 10,763,556 B2 * | 9/2020 | Stenvall | H01M 10/613 |
| 2001/0000880 A1 * | 5/2001 | Chu | H01L 23/345 |
| | | | 165/263 |
| 2001/0040025 A1 | 11/2001 | Jurisich | |
| 2004/0067414 A1 | 4/2004 | Wei et al. | |
| 2005/0064272 A1 * | 3/2005 | Frank | H01M 8/0258 |
| | | | 429/508 |
| 2006/0237180 A1 | 10/2006 | Anke et al. | |
| 2011/0180242 A1 | 7/2011 | Urata et al. | |
| 2012/0237805 A1 * | 9/2012 | Abels | F28F 3/12 |
| | | | 228/136 |
| 2013/0071714 A1 * | 3/2013 | Perry | H01M 8/2465 |
| | | | 429/101 |
| 2013/0143093 A1 * | 6/2013 | Teng | H01M 10/625 |
| | | | 429/120 |
| 2014/0272496 A1 * | 9/2014 | Han | H01M 10/613 |
| | | | 429/83 |
| 2015/0086831 A1 * | 3/2015 | Haussmann | H01M 10/625 |
| | | | 429/120 |
| 2016/0043454 A1 * | 2/2016 | Shaaia | F28F 3/12 |
| | | | 29/890.035 |
| 2016/0238323 A1 * | 8/2016 | Jones | F28D 1/0383 |
| 2016/0372765 A1 * | 12/2016 | Jones | H01M 8/0267 |
| 2017/0194679 A1 * | 7/2017 | Chakraborty | F28F 3/12 |
| 2018/0166754 A1 | 6/2018 | Dudley et al. | |
| 2019/0015835 A1 * | 1/2019 | Chang | F28D 15/00 |
| 2019/0113285 A1 * | 4/2019 | Irmler | F28D 9/0025 |
| 2019/0356028 A1 * | 11/2019 | Cassard | H01M 10/613 |
| 2020/0398634 A1 * | 12/2020 | Cheadle | F24H 1/121 |
| 2021/0151818 A1 * | 5/2021 | Becker | H01M 10/613 |

* cited by examiner

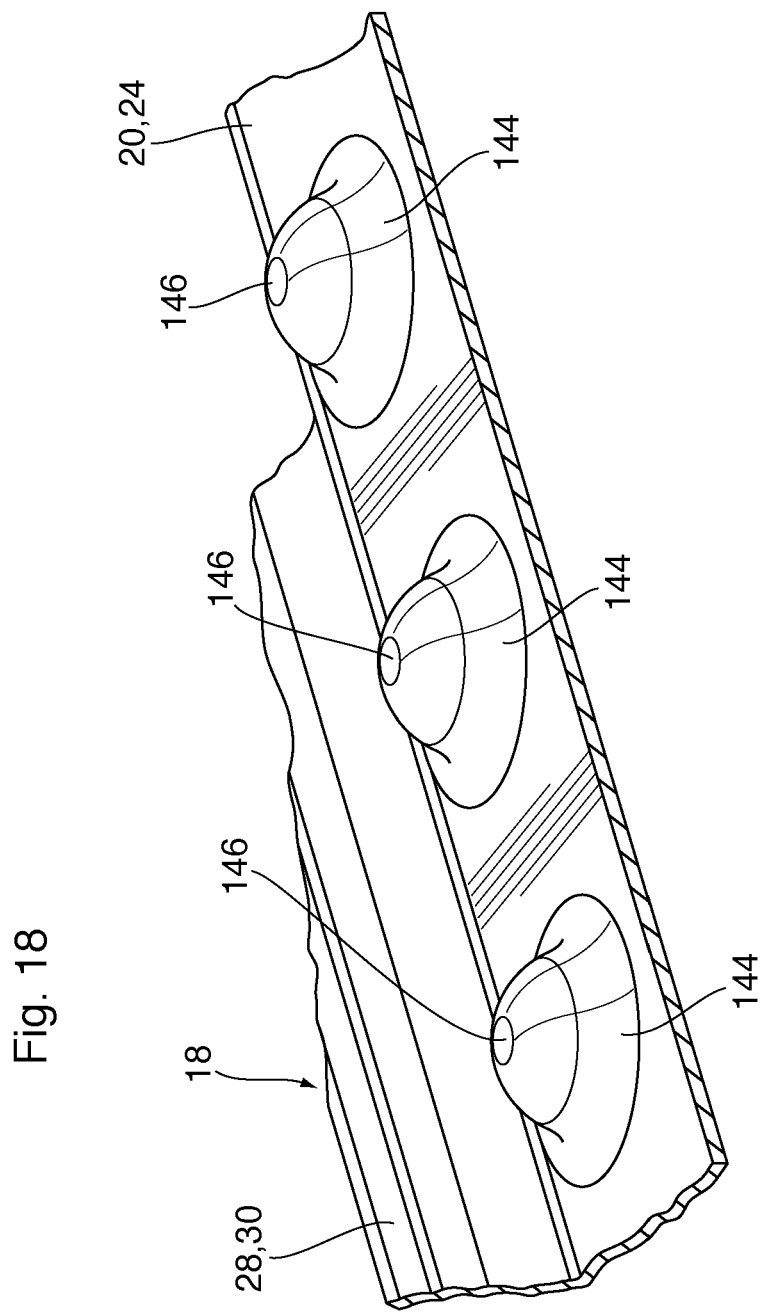

HEAT EXCHANGER WITH PARALLEL FLOW FEATURES TO ENHANCE HEAT CONDUCTION

CROSS-REFERENCE TO RELATED APPLICATIONS

The present application is a U.S. national phase of International Patent Application No. PCT/CA2019/050745, entitled "HEAT EXCHANGER WITH PARALLEL FLOW FEATURES TO ENHANCE HEAT CONDUCTION", filed on May 30, 2019. International Patent Application No. PCT/CA2019/050745 claims priority to U.S. Provisional Patent Application No. 62/703,734, entitled "HEAT EXCHANGER WITH PARALLEL FLOW FEATURES TO ENHANCE HEAT CONDUCTION", and filed on Jul. 26, 2018. International Patent Application No. PCT/CA2019/050745 additionally claims priority to United States Provisional Patent Application No. 62/719,266, entitled "HEAT EXCHANGER WITH PARALLEL FLOW FEATURES TO ENHANCE HEAT CONDUCTION", and filed on Aug. 17, 2018. The entire contents of each of the above-listed applications are hereby incorporated by reference for all purposes.

TECHNICAL FIELD

The present disclosure relates to thermal management of rechargeable batteries within an energy storage system of a battery electric vehicle (BEV) or hybrid electric vehicle (HEV), and particularly to heat exchangers adapted for cooling rechargeable batteries.

BACKGROUND

Energy storage systems such as those used in BEVs and HEVs comprise rechargeable lithium-ion batteries. A typical rechargeable battery for a BEV or HEV comprises a number of battery modules which are electrically connected together in series and/or in parallel to provide the battery with the desired system voltage and capacity. Each battery module comprises a plurality of battery cells which are electrically connected together in series and/or parallel, wherein the battery cells may be in the form of pouch cells, prismatic cells or cylindrical cells.

Rechargeable vehicle batteries in BEVs and HEVs generate large amounts of heat that need to be dissipated, therefore these types of batteries or battery systems need to be cooled to extend their service life.

Liquid cooled heat exchangers can be used to manage the thermal load of these rechargeable vehicle batteries. These battery heat exchangers typically comprise "cold plate" heat exchangers or "ICE" ("inter-cell elements") plate heat exchangers. A cold plate heat exchanger is a heat exchanger having a flat upper surface upon which one or more battery cells is arranged, wherein the number of battery cells associated with each cold plate is variable and may, depending on the area of the cold plate, comprise one or more battery modules. Typically, the battery cells arranged on the cold plate will be prismatic cells or cylindrical cells, which are housed in rigid containers. For example, prismatic cells may be housed in box-like containers which are arranged in face-to-face contact with each other.

In contrast, ICE plate heat exchangers are arranged or "sandwiched" between the adjacent pouch cells or prismatic cells, the individual ICE plate heat exchangers being fluidically connected together by common inlet and outlet manifolds. Examples of cold plate heat exchangers and ICE plate heat exchangers are described in commonly assigned U.S. Pat. No. 10,263,301 entitled COUNTER-FLOW HEAT EXCHANGER FOR BATTERY THERMAL MANAGEMENT APPLICATIONS, which is incorporated herein by reference in its entirety.

Temperature uniformity across the surface of battery heat exchangers is an important consideration in the thermal management of these types of battery units or overall battery systems as temperature uniformity across the surface of the heat exchanger relates to ensuring that there is a minimum temperature differential within the individual battery cells and between adjacent battery cells of the vehicle battery. Ensuring adequate temperature uniformity is a challenging aspect of heat exchanger design since the temperature of the heat transfer fluid is higher at the outlet than at the inlet.

There is a need for battery heat exchangers which achieve improved temperature uniformity across the surfaces which are in contact with the battery cells.

SUMMARY

In accordance with an aspect of the present disclosure, there is provided a heat exchanger, comprising: (a) a first plate having an inner surface and an outer surface; (b) a second plate having an inner surface and an outer surface, wherein the first and second plates are joined together with their inner surfaces in opposed facing relation to one another, and with portions of the inner surfaces being spaced apart from one another; (c) a plurality of fluid flow passages adapted for flow of a heat transfer fluid, and located between the spaced apart portions of the inner surfaces of the first and second plates; (d) an inlet port for supplying the heat transfer fluid to the plurality of fluid flow passages; and (e) an outlet port for discharging the heat transfer fluid from the plurality of fluid flow passages; wherein the inlet and outlet ports are located proximate to a first end of the heat exchanger, and the plurality of fluid flow passages are arranged along a longitudinal axis of the heat exchanger.

According to an aspect, each of the fluid flow passages comprises: (i) a first end through which the fluid flow passage communicates with the inlet port; (ii) a second end through which the fluid flow passage communicates with the outlet port; (iii) a first cross-flow channel extending transversely across the heat exchanger, wherein the first cross-flow channel is in flow communication with the inlet port through the first end of the fluid flow passage; and (iv) a second cross-flow channel extending transversely across the heat exchanger, wherein the second cross-flow channel is in flow communication with the outlet port through the second end of the fluid flow passage.

According to an aspect, the first and second cross-flow channels of each said fluid flow passage are spaced apart from one another along the longitudinal axis; and each said fluid flow passage has at least one of: its first cross-flow channel located immediately adjacent to and in close proximity to the second cross-flow channel of an adjacent one of said fluid flow passages; and its second cross-flow channel located immediately adjacent to and in close proximity to the first cross-flow channel of an adjacent one of the fluid flow passages.

According to an aspect, the first and second cross-flow channels located immediately adjacent to and in close proximity to each other are separated by a distance which is less than a width of one of said first and second cross-flow channels.

According to an aspect, the first and second cross-flow channels located immediately adjacent to and in close proximity to each other are separated by a single rib which partially defines each of said first and second cross-flow channels; and the rib has a width which is less than a width of one of said first and second cross-flow channels.

BRIEF DESCRIPTION OF THE FIGURES

Exemplary embodiments of the present disclosure will now be described, by way of example, with reference to the accompanying drawings, in which:

FIG. 18 is a partial, enlarged cross section along line 18-18' of FIG. 17.

DETAILED DESCRIPTION

Figure 1:
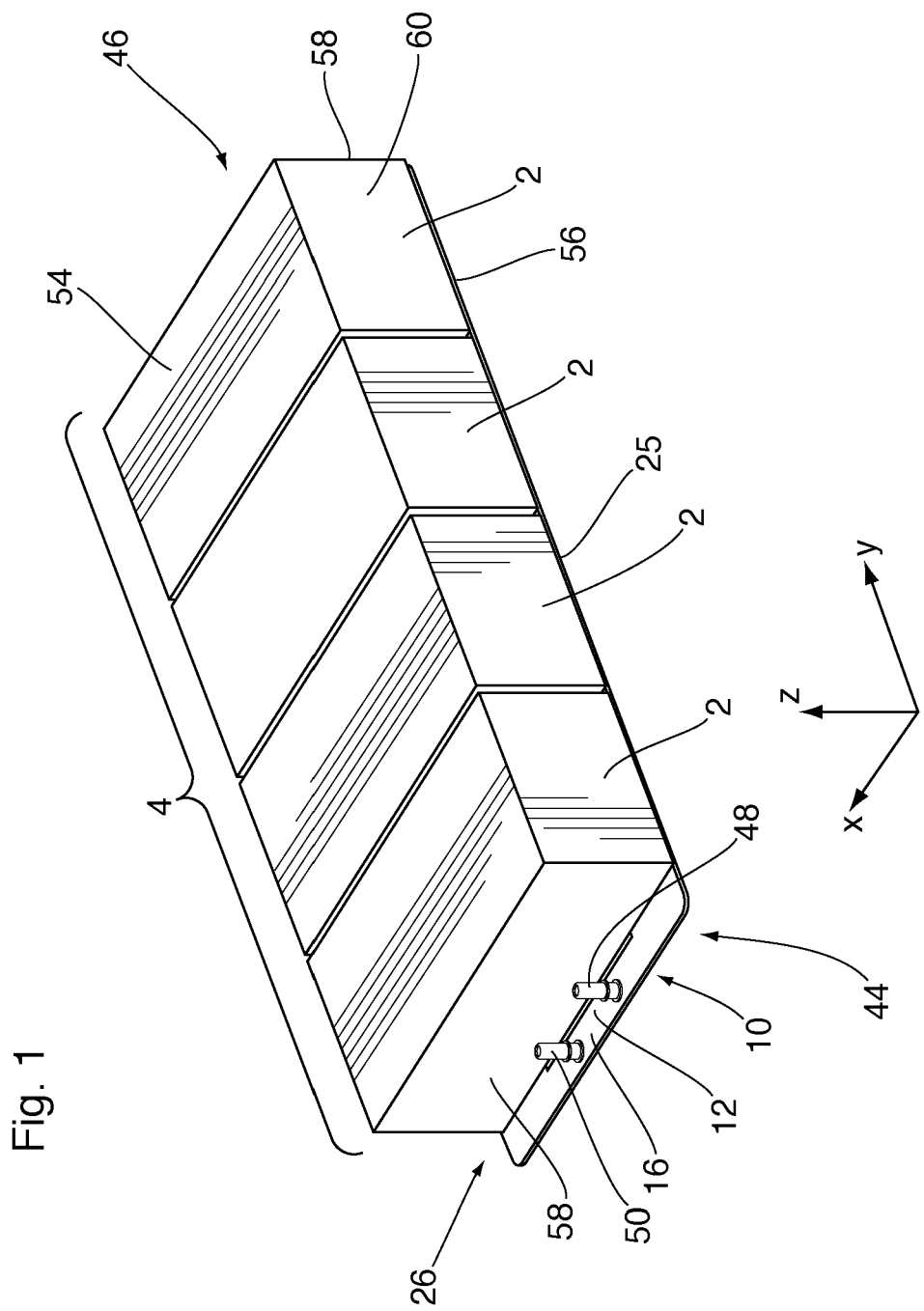
FIG. 1 is a perspective view of a battery heat exchanger with a plurality of battery cells supported on its upper surface.

The heat exchangers described herein are generally flat, planar fluid-carrying panels having opposed outer surfaces, at least one of the outer surfaces being adapted for thermal contact with one or more battery cells and/or battery module(s) of a rechargeable battery of a BEV or HEV.

In the embodiments described herein, there are several instances where a first fluid channel or flow passage is described as being "immediately adjacent to and in close proximity to" a second fluid channel or flow passage, such that heat energy is transferred between the first and second fluid channels or flow passages by conduction through the plates making up the heat exchanger, thereby providing enhanced heat transfer. As defined herein, a first flow channel/flow passage is considered to be immediately adjacent to and in close proximity to a second fluid channel/flow passage when the first and second fluid channels/flow passages are separated by a distance which is equal to or less than a width of one of the first and second fluid channels/flow passages. For example, in some embodiments, the first and second fluid channels/flow passages may be separated by a single rib which partially defines each of the first and second fluid channels/flow passages, wherein the rib has a width which is less than a width of one of the first and second fluid channels/flow passages.

A heat exchanger 10 according to a first embodiment is shown in FIGS. 1 to 6. Heat exchanger 10 comprises a first plate 12 having inner and outer surfaces 14, 16 and a second plate 18 having inner and outer surfaces 20, 22. Heat exchanger 10 is a "cold plate" in which the outer surface 16 of the first plate 12 provides a flat surface upon which one or more battery cells 2 and/or battery modules 4 are supported.

FIG. 1 schematically shows a battery module 4 comprising four prismatic battery cells 2 supported on the outer surface 16 of first plate 12. Each battery cell 2 has a plurality of rectangular surfaces, including a top surface 54, a bottom surface 56, a pair of opposed side surfaces 58, and a pair of opposed end surfaces 60. The bottom surfaces 56 are in thermal contact with the outer surface 16 of first plate 12. Although not shown, the battery cells 2 are electrically connected together, and the battery module 4 is electrically connected to other battery modules of the vehicle battery. Also, the number and arrangement of the battery cells 2 and module(s) 4 supported on the heat exchanger may differ from that shown.

A thin layer of thermal interface material (TIM) (not shown) may be provided between the outer surface 16 of first plate 12 and the bottom surfaces 56 of the battery cells 2 to enhance thermal contact between the heat exchanger 10 and battery cells 2. The TIM may comprise a thermally conductive grease, wax or metallic material.

The heat exchanger 10 is somewhat elongated along a longitudinal axis y, having a pair of longitudinally extending first and second side edges 25, 26 and a pair of transversely extending first and second end edges 44, 46 (along transverse axis x), wherein side edges 25, 26 and end edges 44, 46 are also referred to herein as the side edges and end edges of the first and second plates 12, 18.

The second plate 18 has opposed inner and outer surfaces 20, 22 and is shaped, for example by stamping, drawing or molding, to provide a plurality of embossments which together define a central area 24 having a plurality of grooves or channels surrounded on all sides by a planar flange 28 defining a planar peripheral sealing surface 30 on the inner surface 20 of second plate 18. The first and second plates 12, 18 are sealingly joined together with their inner surfaces 14, 20 in opposed facing relation to one another, and with portions of the inner surfaces 14, 20 being spaced apart from one another. The planar peripheral sealing surface 30 of second plate 18 is sealingly joined to a planar, peripheral sealing surface 32 on the inner surface 14 of first plate 12, with portions of the inner surfaces 14, 20 inward of respective sealing surfaces 32, 30 being spaced apart from one another.

At least some of the channels or grooves in the central area 24 of second plate 18 define the bottoms and sides of a plurality of fluid flow passages 34 having open first and second ends 36, 38, and which are further described below. The tops of the fluid flow passages 34 are defined by the inner surface 14 of the first plate 12.

Heat exchanger 10 further comprises first and second ports 40, 42 comprising apertures in the first plate 12, located inwardly of the planar peripheral sealing surface 32, through which the heat transfer fluid is introduced into and discharged from the heat exchanger 10. The first and second ports 40, 42 are both located along one of the end edges 44 of the heat exchanger 10. The first port 40 is provided with a first tubular fitting 48 and the second port 42 is provided with a second tubular fitting 50, the fittings 48, 50 projecting upwardly from the outer surface 16 of first plate 12, to provide flow communication between the fluid flow passages 34 and a fluid circulation system (not shown) of the vehicle. The ports 40, 42 and fittings 48, 50 are located outside of, and immediately adjacent to, the area 62 of the outer surface 16 of first plate 12 which is occupied by battery cells 2, as shown in FIG. 1. The area 62 occupied by battery cells 2 is also referred to herein as the "heat transfer surface area", as is shown in outline in FIG. 3, in relation to the second plate 18.

The first and second plates 12, 18 and the fittings 48, 50 may be comprised of aluminum or alloys thereof, and may be joined together by brazing in a brazing oven. Although the first and second plates 12, 18 are shown as having the same or similar thickness, the first plate 12 may comprise a heat sink or heat spreader having a thickness which is greater than that of the second plate 18 across at least a portion of its area, as further described below.

As the heat transfer fluid flows through the fluid flow passages 34 it absorbs heat from the battery cells 2, and will gradually become heated as it flows between the first and second ports 40, 42. This results in temperature differences, as measured on the outer surface 16 of first plate 12 and/or the TIM, between the portions of heat exchanger 10 which are in contact with cooler fluid entering through one of the ports 40 or 42 and portions of heat exchanger 10 which are in contact with warmer fluid which will be discharged through the other port 40 or 42. The temperature uniformity ($T_{max}-T_{min}$) of heat exchanger 10 is defined by the magnitude of these temperature differences measured at different points on the outer surface 16 of first plate 12 and/or the TIM. To avoid negative impacts on battery cells 2, the temperature uniformity of heat exchanger 10 should be maintained within a predetermined range.

Heat exchanger 10 includes three fluid flow passages 34 arranged in parallel, each having an area which may or may not correspond to an area of the bottom surface 56 one or more battery cells 2 or battery modules 4. However, it will be appreciated that the number of fluid flow passages 34 does not necessarily correspond to the number of battery cells 2 and/or battery modules 4 supported on the heat exchanger 10. For example, more than one fluid flow passage 34 may be provided for each battery cell, or one fluid flow passage 34 may cover an area corresponding to the area occupied by two or more contiguous battery cells 2. Although the battery cells 2 are shown in FIG. 1 with their side surfaces 58 transverse to the longitudinal dimension of heat exchanger 10 (y-axis), it will be appreciated that the side surfaces 58 may instead be parallel to the longitudinal dimension of heat exchanger 10, and that battery cells 2 may comprise rectangular prisms having different dimensions from those which are shown in FIG. 1.

Figure 6:
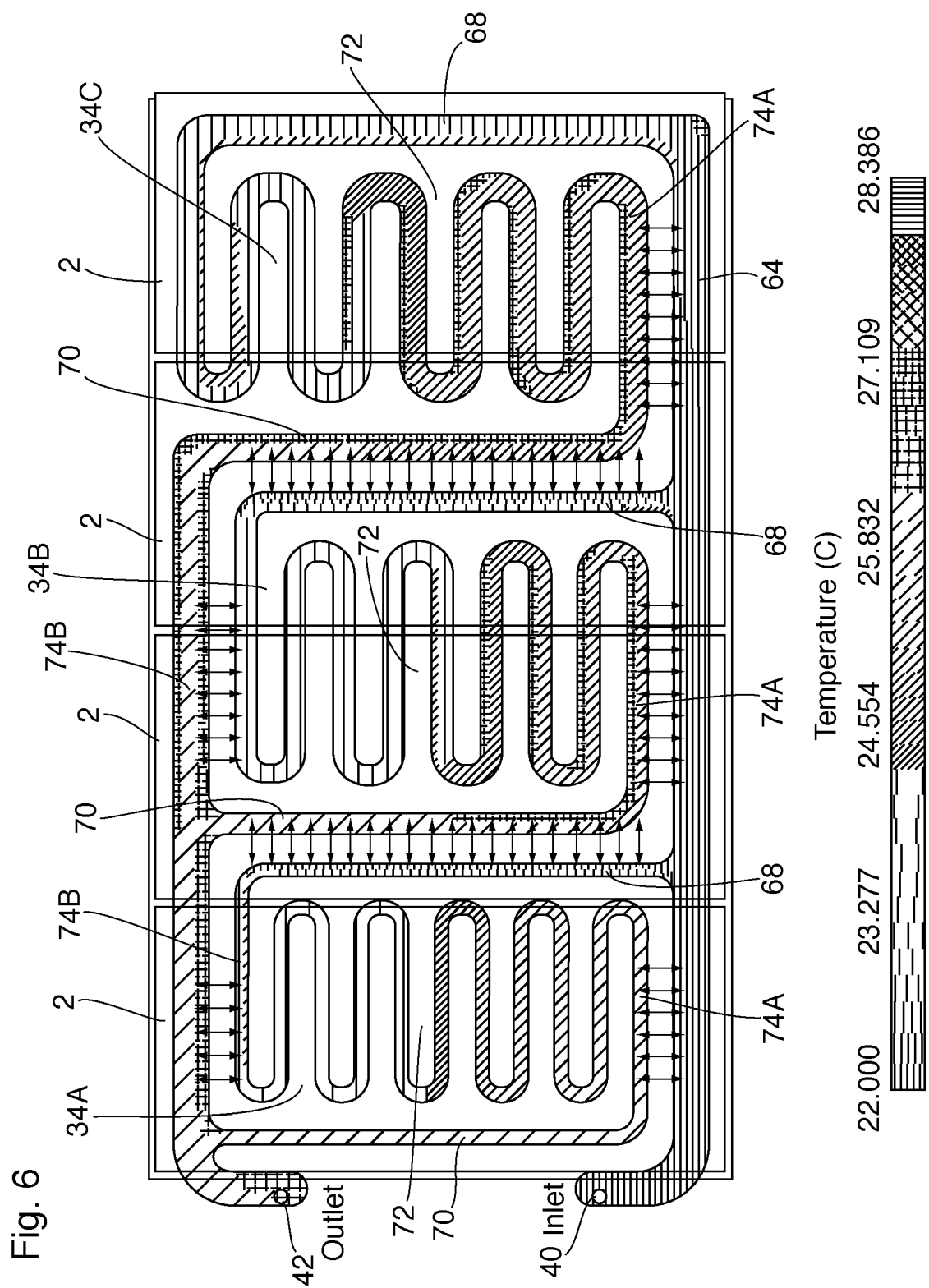
FIG. 6 illustrates the heat transfer surface area of the heat exchanger of FIG. 1.

The three fluid flow passages 34 are labelled 34A, 34B and 34C in the drawings. Fluid flow passage 34A is proximate to end edge 44 at which the ports 40, 42 are located. Due to the overall U-shaped flow configuration of heat exchanger 10, the absolute maximum and minimum temperatures of the heat transfer fluid will occur close to the ports 40, 42, and proximate to end edge 44. For example, where the first port 40 is the inlet port and the second port 42 is the outlet port, FIG. 6 shows that the absolute minimum temperatures of the heat transfer fluid will occur close to the first port 40, proximate to side edge 25 and end edge 44, and the absolute maximum temperatures will occur close to the second port 42, proximate to side edge 26 and end edge 46. The opposite will be true where the direction of fluid flow is reversed, such that the first port 40 is the outlet port and the second port 42 is the inlet port.

Temperature uniformity is also affected by changes in the heat transfer coefficient caused by the development of boundary layers along the walls of flow passages 34 as the heat transfer fluid flows between the ports 40. The heat transfer coefficient decreases as the boundary layers become more fully developed, and therefore the heat transfer coefficient close to inlet port 40 or 42 will generally be higher than the heat transfer coefficient close to the outlet port 40 or 42. This difference in heat transfer coefficient further contributes to the temperature differential between the areas proximate to ports 40, 42, further reducing temperature uniformity between them.

In addition to maintaining adequate temperature uniformity, maximum battery cell temperatures must be maintained below a specified value, and the pressure drop of the fluid being pumped through the heat exchanger 10 must be maintained within acceptable levels to avoid excessive power consumption.

In the illustrated embodiment, the first end 36 of each fluid flow passage 34 is in flow communication with the first port 40 through a first fluid passage 64. The first fluid passage 64 extends along the side edge 25 inwardly of the planar flange 28, having a first end located at the first port 40, proximate to end edge 44, and a second end which is located proximate to opposite end edge 46. With this arrangement, the first end 36 of each fluid flow passage 34 comprises a branch opening of the first fluid passage 64, with the first end 36 of fluid flow passage 34A being closest to the first port 40, first end 36 of fluid flow passage 34C being farthest from first port 40, and the first end 36 of fluid flow passage 34B being intermediate the first ends 36 of fluid flow passages 34A and 34C. Depending on whether the first port 40 is the inlet or outlet port, the first fluid passage 64 may be referred to herein as the "fluid inlet passage" or the "fluid outlet passage".

The first fluid passage 64 extends inwardly and transversely along end edge 44 proximate to the first port 40, and may have a constant width throughout its length. Furthermore, it can be seen that the first ends 36 of the fluid flow passages 34 become progressively larger (along y axis) with increasing distance from the first port 40, such that the first end 36 of fluid flow passage 34 is narrower than the first ends 36 of fluid flow passages 34B and 34C, and the first end 36 of fluid flow passage 34C is wider than the first ends 36 of fluid flow passages 34A and 34B. The progressively increasing widths of the first ends 36 assist in balancing the pressure drops of the three fluid flow passages 34A, 34B and 34C.

The second end 38 of each fluid flow passage 34 is in flow communication with the second port 42 through a second fluid passage 66. The second fluid passage 66 extends along the side edge 26 inwardly of the planar flange 28, having a first end located at the second port 42, proximate to end edge 44, and a second end which is located proximate to opposite end edge 46. With this arrangement, the second end 38 of each fluid flow passage 34 comprises a branch opening of the second fluid passage 66, with the second end 38 of fluid flow passage 34A being closest to the second port 42, second end 38 of fluid flow passage 34C being farthest from second port 42, and the second end 38 of fluid flow passage 34B being intermediate the second ends 38 of fluid flow passages 34A and 34C. Depending on whether the second port 42 is the inlet or outlet port, the second fluid passage 66 may be referred to herein as the "fluid inlet passage" or the "fluid outlet passage".

The second fluid passage 66 extends inwardly and transversely along end edge 44 proximate to the second port 42 and has a constant width throughout its length. Furthermore, it can be seen that the second ends 38 of the fluid flow passages 34 become progressively larger (along y axis) with increasing distance from the second port 42, such that the second end 38 of fluid flow passage 34 is narrower than the second ends 36 of fluid flow passages 34B and 34C, and the second end 38 of fluid flow passage 34C is wider than the second ends 38 of fluid flow passages 34A and 34B. The progressively increasing widths of the second ends 38 assist in balancing the pressure drops of the three fluid flow passages 34A, 34B and 34C.

Each of the fluid flow passages 34 includes a pair of cross-flow channels, namely a first cross-flow channel 68 and a second cross-flow channel 70. The first end 36 of each fluid flow passage 34 serves as an inlet or outlet opening between the first fluid passage 64 and the first cross-flow channel 68 and the second end 38 of each fluid flow passage 34 serves as an inlet or outlet opening between the second cross-flow channel 70 and the second fluid passage 66.

The cross-flow channels 68, 70 extend transversely across the heat exchanger 10. In the present embodiment the cross-flow channels 68, 70 are straight and parallel to one another and to the transverse axis x, and are of constant width (along y axis). However, it will be appreciated that this is not essential, and the cross-flow channels may be curved, wavy, non-parallel to one another, non-parallel to the x axis, and of variable width.

The first and second cross-flow channels 68, 70 of each fluid flow passage 34 are spaced apart from one another along the y-axis, and each fluid flow passage 34 has at least one of:

its first cross-flow channel 68 immediately adjacent to and in close proximity to the second cross-flow channel 70 of an adjacent fluid flow passage 34; and its second cross-flow channel 70 immediately adjacent to and in close proximity to the first cross-flow channel 68 of an adjacent fluid flow passage 34.

In this regard, fluid flow passage 34A has its second cross-flow channel 70 proximate to end edge 44, and its first cross-flow channel 68 immediately adjacent to and in close proximity to the second cross-flow channel 70 of fluid flow passage 34B. Fluid flow passage 34C has its second cross-flow channel 70 immediately adjacent to and in close proximity to the first cross-flow channel 70 of fluid flow passage 34B, and its first cross-flow channel 68 proximate to end edge 46.

For example, where the first port 40 is the inlet port and the second port 42 is the outlet port, as shown in FIG. 6, the first cross-flow channel 68 of each fluid flow passage 34 receives heat transfer fluid from the first (inlet) port 40, the heat transfer fluid carried by the first cross-flow channel 68 is relatively cool. Also, since the second cross-flow channel 70 of each fluid flow passage 34 discharges heat transfer fluid to the second (outlet) port 42, the heat transfer fluid carried by the second cross-flow channel 70 is relatively hot. According to this flow configuration, where a first cross-flow channel 68 of one fluid flow passage 34 is located immediately adjacent to and in close proximity to, a second cross-flow channel 70 of an adjacent fluid flow passage 34, heat energy will be transferred by conduction through plates 12, 18 from the second cross-flow channel 70 to the first cross-flow channel 68 of the adjacent fluid flow passage 34, thereby providing enhanced heat transfer. FIG. 6 includes arrows to show the conductive heat transfer pathways between the cross-flow channels 68, 70.

In the present embodiment, the first cross-flow channel 68 of fluid flow passage 34A is considered to be immediately adjacent to and in close proximity to the second cross-flow channel 70 of adjacent fluid flow passage 34B because they are separated from each other by a distance (along the y-axis) which is less than a width of one of the first and second cross-flow channels 68, 70.

Furthermore, in the present embodiment, the first cross-flow channel 68 of fluid flow passage 34A is separated from second cross-flow channel 70 of fluid flow passage 34B only by a single rib 80 (FIG. 3) which partially defines each of the cross-flow channels 68, 70, and which has a width which is less than a width of each cross-flow channel 70, the widths being measured along the y axis.

Where the direction of fluid flow is reversed such that the first port 40 is the outlet port and the second port 42 is the inlet port, the opposite is true. More specifically, where a first cross-flow channel 68 of one fluid flow passage 34 is located immediately adjacent to and in close proximity to a second cross-flow channel 70 of an adjacent fluid flow passage 34, as defined above, heat energy will be transferred by conduction through plates 12, 18 from the first cross-flow channel 68 to the second cross-flow channel 70 of the adjacent fluid flow passage 34, thereby providing enhanced heat transfer.

The flow of the heat transfer fluid through adjacently located cross-flow channels 68, 70 is generally parallel, and may either be counter-flow (i.e. opposite directions of flow in channels 68 and 70) or co-flow (same direction of flow in channels 68 and 70). In the illustrated embodiment, the direction of fluid flow through all the counter-flow channels 68 and 70 is the same, i.e. from the first side edge 25 to second side edge 26, such that the cross-flow channels 68, 70 are in co-flow arrangement.

Figure 2:
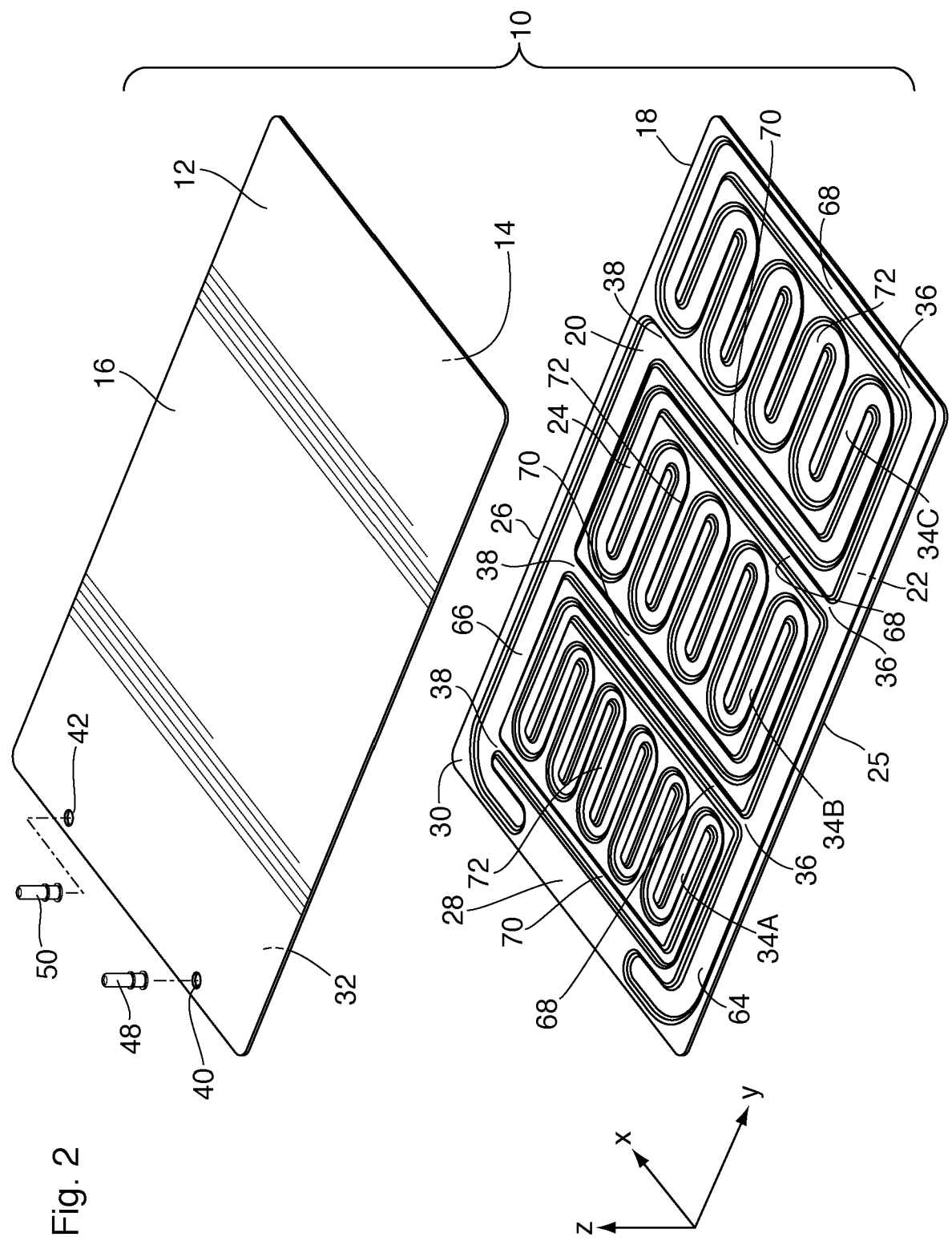
FIG. 2 is an exploded perspective view of the battery heat exchanger of FIG. 1.
Figure 3:
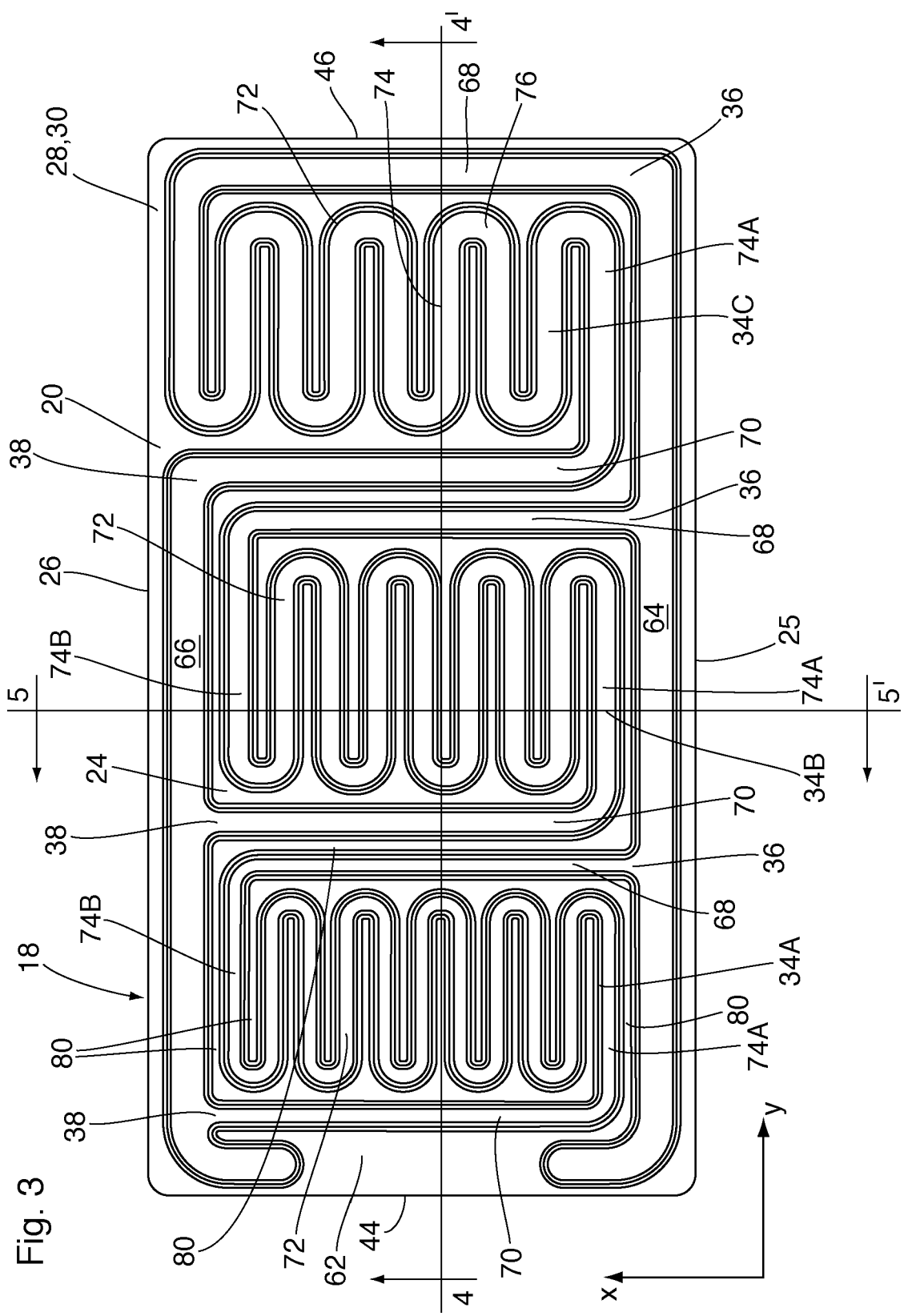
FIG. 3 is a top plan view of the bottom plate of the battery heat exchanger of FIG. 1.
Figure 4:
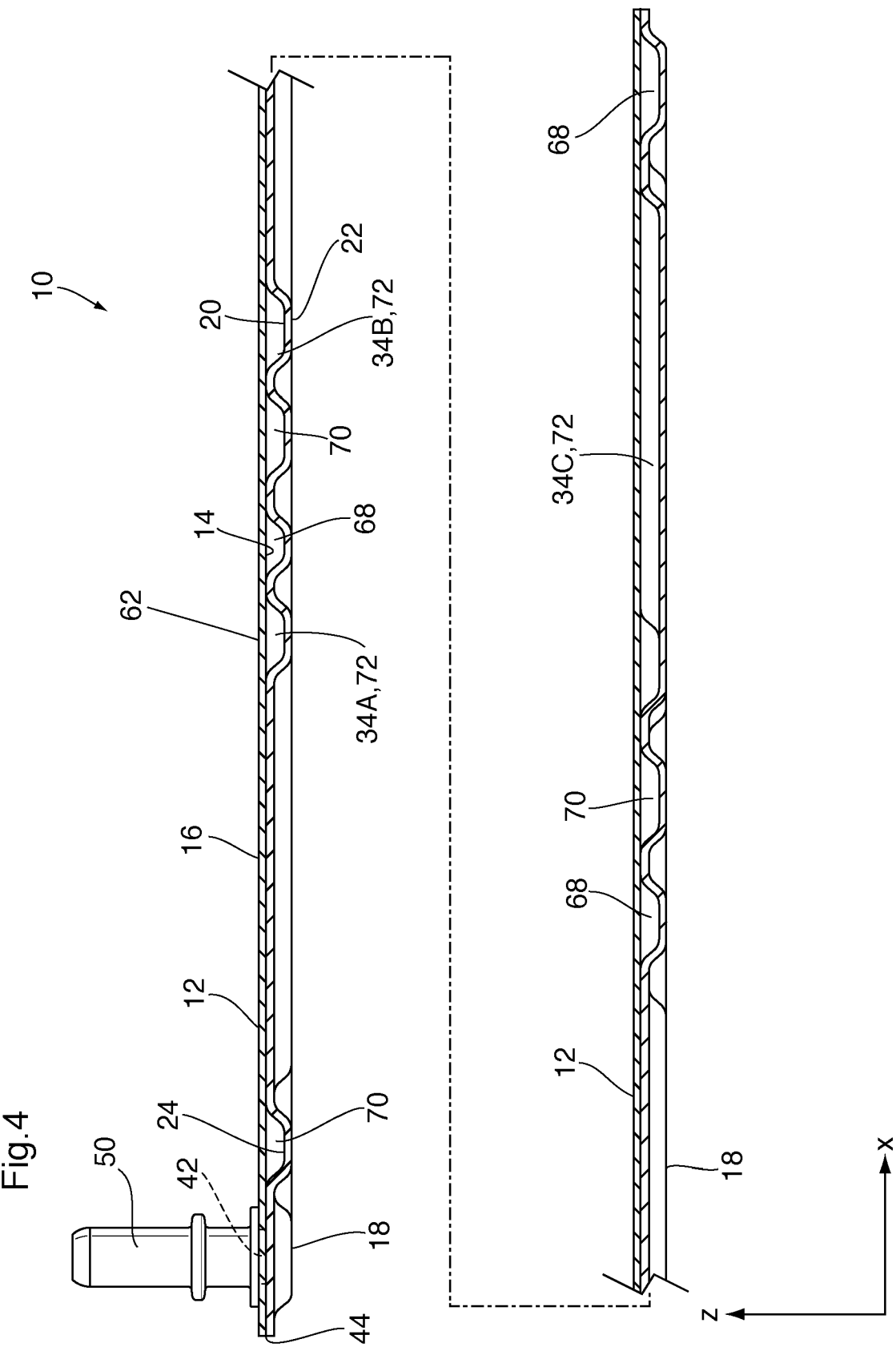
FIG. 4 is a longitudinal cross-section along line 4-4' of FIG. 3.
Figure 5:
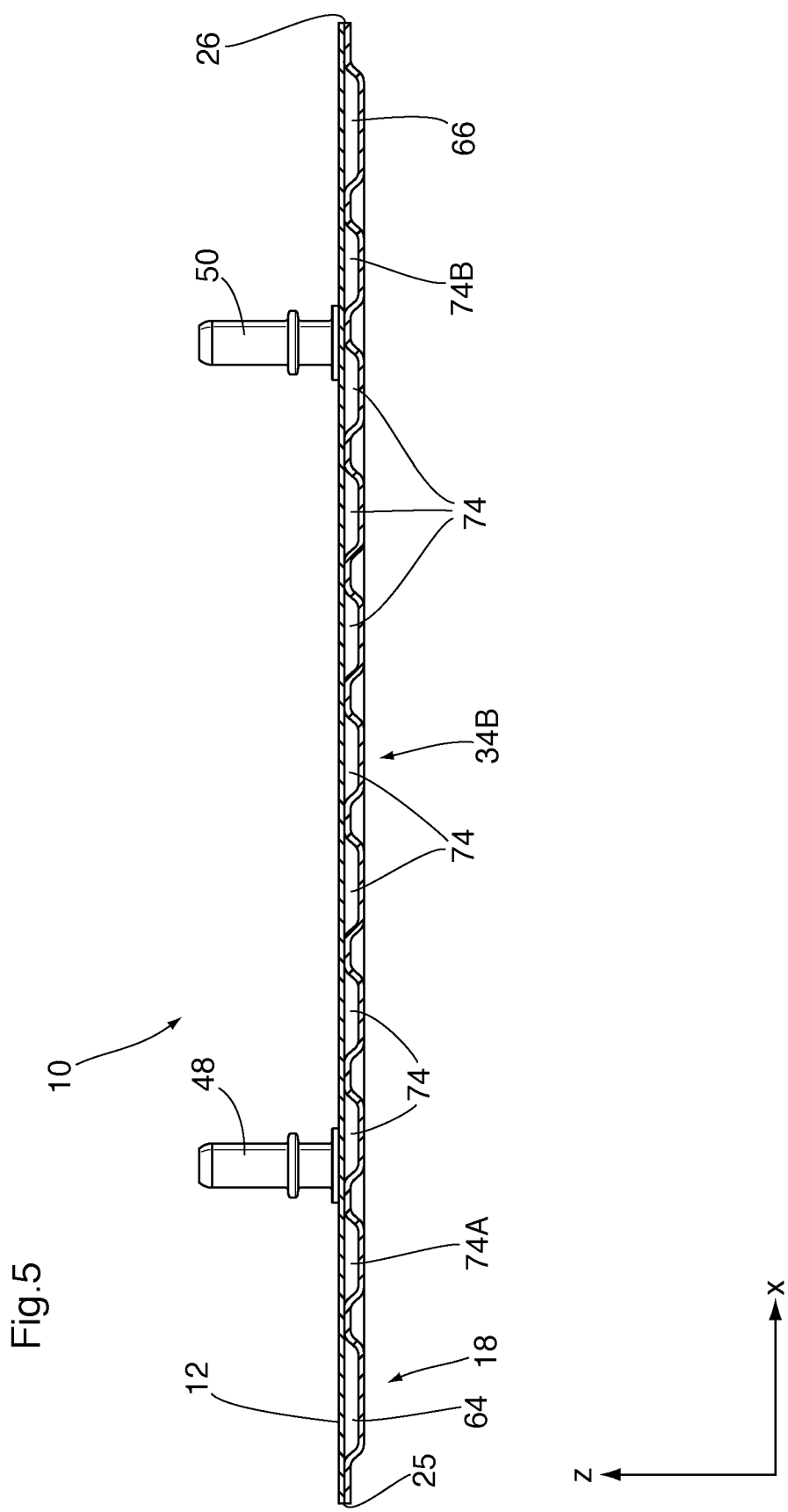
FIG. 5 is a transverse cross-section along line 5-5' of FIG. 3.

As shown in FIG. 2, the widths of the cross-flow channels 68, 70 may be graduated in the same manner as the widths of the first and second ends 36, 38 of fluid flow passages 34, as discussed above, for the purpose of balancing pressure drop. Therefore, fluid flow passage 34A has the narrowest cross-flow channels 68, 70, while fluid flow passage 34C has the widest cross-flow channels 68, 70, and the width of each cross-flow channel 68, 70 may be constant throughout its length, as shown in the drawings.

Situated between and connected to the first and second cross-flow channels 68, 70 of each fluid flow passage 34, there is provided an intermediate flow channel 72 which receives heat transfer fluid from one cross-flow channel 68 or 70 and discharges it to the other cross-flow channel 68 or 70. The intermediate flow channel 72 occupies most of the surface area of each fluid flow passage 34, and most of the heat transfer from the battery cells 2 to the heat transfer fluid occurs through the intermediate flow channels 72. Therefore, the temperature of the heat transfer fluid increases as it flows throughout the length of intermediate flow channel 72 from one cross-flow channel 68 to the other cross-flow channel 70.

The intermediate flow channels 72 are arranged so that the overall direction of fluid flow through the intermediate flow channels 72 is transverse across the heat exchanger 10 from the hot side to the cool side of the heat exchanger 10. For example, where the first port 40 is the inlet port and the second port 42 is the outlet port, the side edge 25 lies along the same side as first port 40 (inlet port) and first fluid passage 64 (fluid inlet passage), and therefore this side of heat exchanger 10 is relatively cool. Also, because side edge 26 lies along the same side as second port 42 (outlet port) and second fluid passage 66 (fluid outlet passage), this side of heat exchanger 10 is relatively hot. Therefore, as the heat transfer fluid is heated inside the intermediate flow channel 72, it flows in a general direction away from the hot side of heat exchanger 10 and toward the cool side of the heat exchanger 10. This further helps to achieve temperature uniformity across the surface area of heat exchanger 10.

The configurations of the intermediate flow channels 72 of the fluid flow passages 34 are highly variable. In the present embodiment, the intermediate flow channels 78 comprise a plurality of convolutions comprising longitudinally-extending straight portions 74 connected by rounded, 180-degree hairpin bends 76. The total transverse width of each intermediate flow channel 72, the individual channel widths of the intermediate flow channels 72, and the number of convolutions are graduated from the fluid flow passage 34A to fluid flow passage 34C. In this regard, the widths of intermediate flow channels 72 increase from fluid flow passage 34A to fluid flow passage 34C, and the number of convolutions decreases from fluid flow passage 34A to fluid flow passage 34C. The increasing channel width and decreasing number of convolutions from fluid flow passages 34A to 34C contributes to a decrease in pressure drop from fluid flow passages 34A to 34C. As shown in the drawings, the intermediate flow channel 72 of each fluid flow passage 34A, 34B, 34C may be of constant width throughout its length (i.e. from one cross-flow channel 68 to the other cross-flow channel 70). The width of the intermediate flow channel 72 is defined as the width of each straight portion 74 (along x axis) and/or the width of each hairpin bend 76 (along y axis).

It will be appreciated that the lengths of the straight portions 74 (along y axis) can be increased or decreased relative to the arrangement of heat exchanger 10. For example, shortening or completely eliminating the straight portions can result in an intermediate flow channel comprising a plurality of zig-zag U bends with substantially no straight portions.

The specific configuration of intermediate flow channels 72 in heat exchanger 10 provides additional areas in which conductive heat transfer takes place. Because the heat transfer fluid 72 flows toward the cooler side of the heat exchanger 10 as it is being heated, there will be relatively hot portions of the intermediate flow channels 72 which conduct heat energy to the relatively cool first or second fluid passage 64 or 66, and there will be relatively cool portions of the intermediate flow channels 72 into which heat energy will be conducted from the relatively hot first or second passage 66, depending on the direction of fluid flow.

For example, where the first port 40 is the inlet port and the second port 42 is the outlet port, it can be seen that the intermediate flow channel 72 of at least one of the fluid flow passages 34 has a straight portion 74 which is immediately adjacent to and in close proximity to the first fluid passage 64, as defined above, this straight portion being identified by reference numeral 74A in FIG. 6 and being separated from first fluid passage 64 only by a single rib 80. Because this straight portion 74A is located toward the outlet end of the intermediate flow channel 72, being in flow communication with the second cross-flow channel 70, it will be carrying relatively hot heat transfer fluid, whereas the first fluid passage 64 (fluid inlet passage) will be carrying relatively cool heat transfer fluid. There will therefore be heat conduction from the straight portion 74A of intermediate flow channel 72 to the first fluid passage 64, as indicated by arrows in FIG. 6. It will be seen that the straight portion 74A and the first fluid passage 64 are in counter-flow arrangement, and that each of the fluid flow passages 34A, 34B and 34C includes such a straight portion 74A.

Similarly, the intermediate flow channel 72 of at least one of the fluid flow passages 34 has one straight portion 74 which is located immediately adjacent to and in close proximity to the second fluid passage 66, as defined above, this straight portion being identified by reference numeral 74B in FIG. 6 and being separated from second fluid passage 66 only by a single rib 80. Because this straight portion 74B is located toward the inlet end of the intermediate flow channel 72, being in flow communication with the first cross-flow channel 68, it will be carrying relatively cool heat transfer fluid, whereas the second fluid passage 66 (fluid outlet passage) will be carrying relatively hot heat transfer fluid. There will therefore be heat conduction from the second fluid passage 66 to the straight portion 74B of intermediate flow channel 72, as indicated by the arrows in FIG. 6. It will be seen that the straight portion 74B and the second fluid outlet passage 66 are in co-flow arrangement, and that only fluid flow passages 34A and 34B include such a straight portion 74B.

Figure 7:
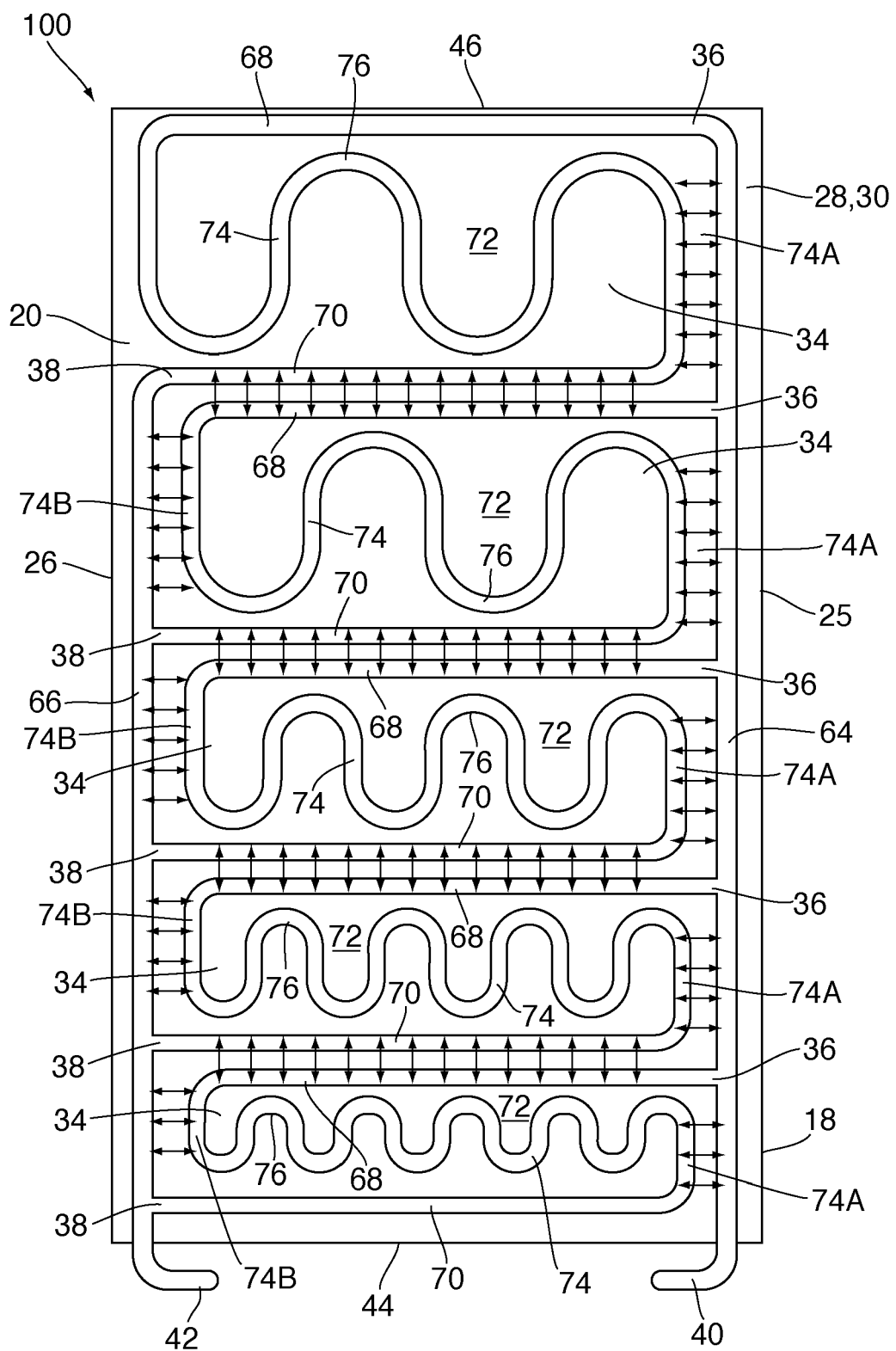
FIG. 7 is a schematic top plan view of a battery heat exchanger according to a second embodiment.

FIG. 7 illustrates a heat exchanger 100 according to a second embodiment, in which like elements are identified with like reference numerals in the drawings and the following description.

Heat exchanger 100 includes the same general arrangement of fluid flow passages 34, first fluid passage 64 and second fluid passage 66 as in heat exchanger 10. However, there are a number of differences between heat exchangers 10 and 100, such as: heat exchanger 100 includes five fluid flow passages 34, showing that the number of fluid flow passages 34 is variable; the number of convolutions in the intermediate flow channels 72 is reduced with increasing distance from the first and second ports 40, 42; the convolutions in the intermediate flow channels 72 are not required to have straight longitudinal portions 74, but rather may include portions which are angled to the longitudinal axis and/or are curved.

As shown by the arrows in FIG. 7, there will be conductive heat transfer between adjacently located cross-flow channels 68, 70, and also between the longitudinal portions 74 of intermediate flow channels 72 and the adjacent first and second fluid passages 64, 66. It will be appreciated that the portions of flow passages 64, 66, 68, 70, 74 between which conductive heat transfer occurs, as defined by arrows, are immediately adjacent to and in close proximity to each other, being separated from one another only by a single rib which partially defines a flow passage 64, 66, 68, 70, 74; the rib having a width which is less than a width of the flow passages 64, 66, 68, 70, 74 which it separates.

Figure 8:
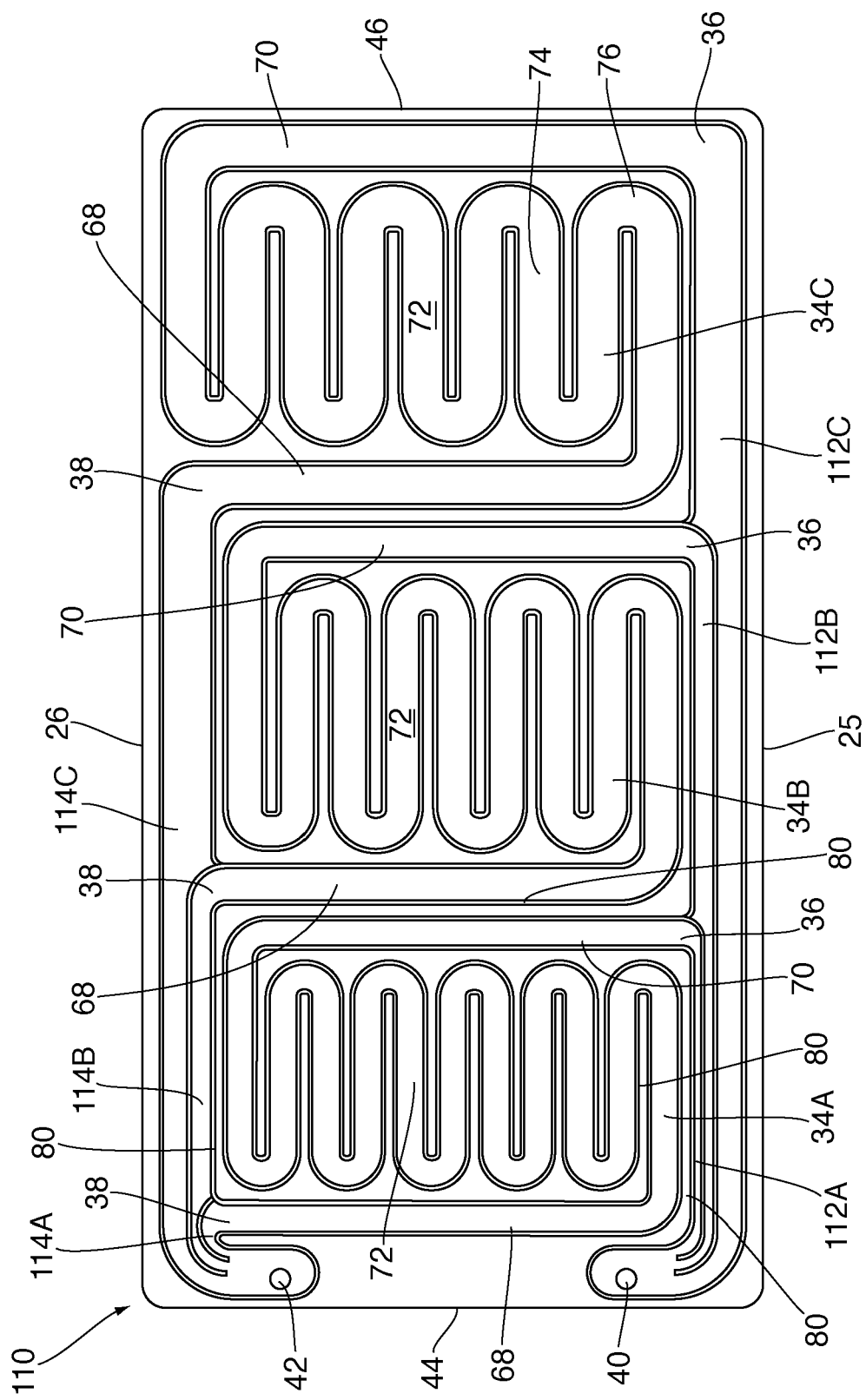
FIG. 8 is a schematic top plan view of a battery heat exchanger according to a third embodiment.

FIG. 8 schematically illustrates a heat exchanger 110 according to a third embodiment in which like elements are identified with like reference numerals in the drawings and the following description. In heat exchanger 110, the first and second fluid passages 64, 66 are replaced by individual fluid passages 112, 114 which connect the first and second ports 40, 42 to the respective first and second ends 36, 38 of the fluid flow passages 34. These individual fluid passages 112, 114 may be graduated in width in order to adjust the pressure drops in the fluid flow passages 34, according to the principles discussed above. The individual fluid passages 112, 114 of fluid flow passages 34A, 34B and 34C are labelled in FIG. 8 as 112A, 112B, 112C, 114A, 114B and 114C. The heat conduction pathways in heat exchanger 110 of FIG. 8 are the same as those of heat exchanger 10 described above.

Figure 9:
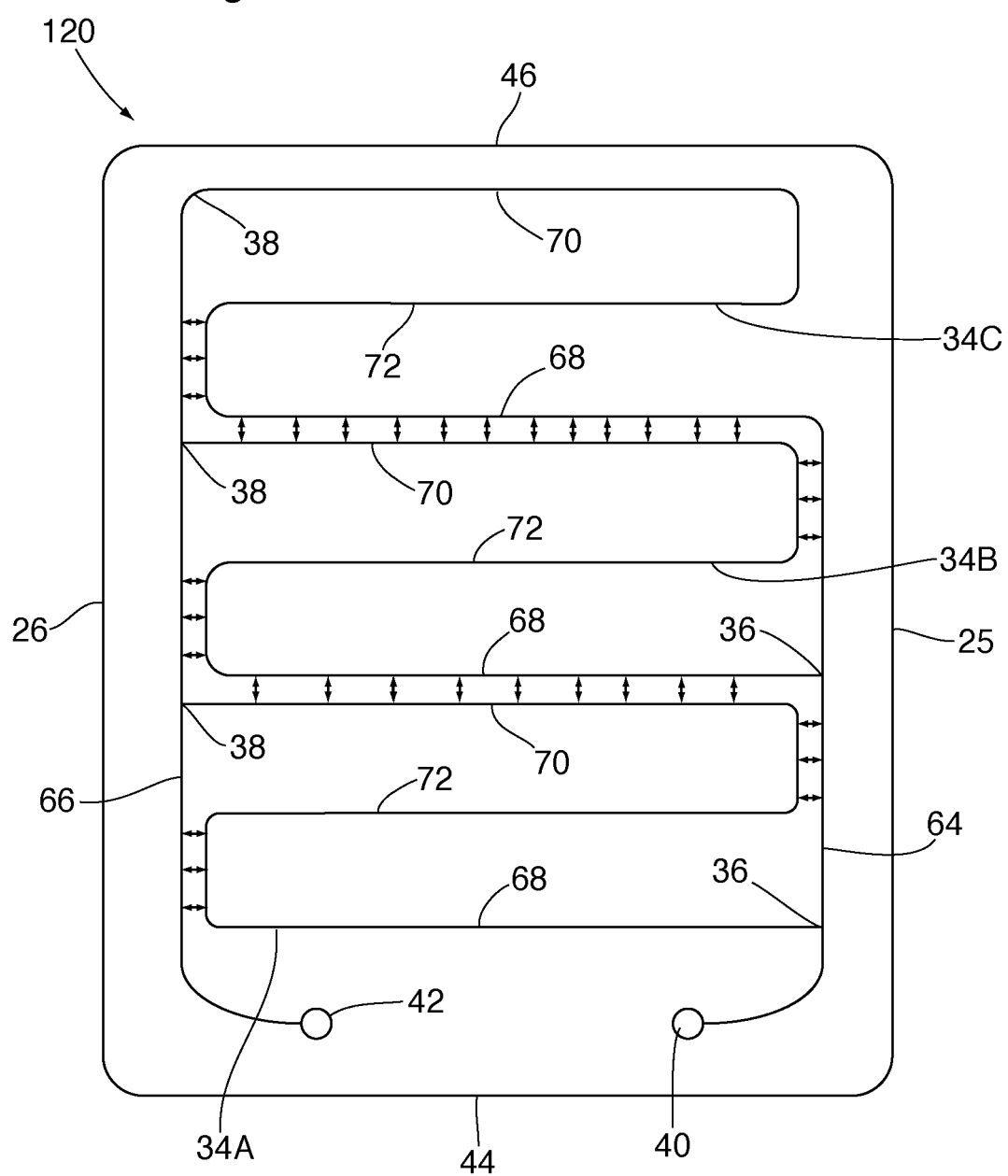
FIG. 9 is a schematic top plan view of a battery heat exchanger according to a fourth embodiment.

FIG. 9 schematically illustrates a heat exchanger 120 according to a fourth embodiment in which like elements are identified with like reference numerals in the drawings and the following description. Heat exchanger 120 includes three fluid flow passages 34 which are labelled 34A, 34B and 34C. The configuration of the fluid flow passages 34 is similar to that of heat exchanger 10, except that the first end 36 of each fluid flow passage 34 is closer to the first end edge 44 of heat exchanger 120 than the second end 38 of the fluid flow passage 34; and the intermediate flow channel 72 of each fluid flow passage 34 comprises a transversely extending channel with longitudinal end portions, rather than a plurality of convolutions as in heat exchanger 10.

As shown by the arrows in FIG. 9, there will be conductive heat transfer between adjacently located cross-flow channels 68, 70, and also between the longitudinal end portions of intermediate flow channels 72 and the adjacent first and second fluid passages 64, 66. It will be appreciated that the portions of flow passages 64, 66, 68, 70, 72 between which conductive heat transfer occurs, as defined by arrows, are immediately adjacent to and in close proximity to each other, being separated from one another only by a single rib which partially defines a flow passage 64, 66, 68, 70, 72; the rib having a width which is less than a width of the flow passages 64, 66, 68, 70, 72 which it separates.

Figure 10:
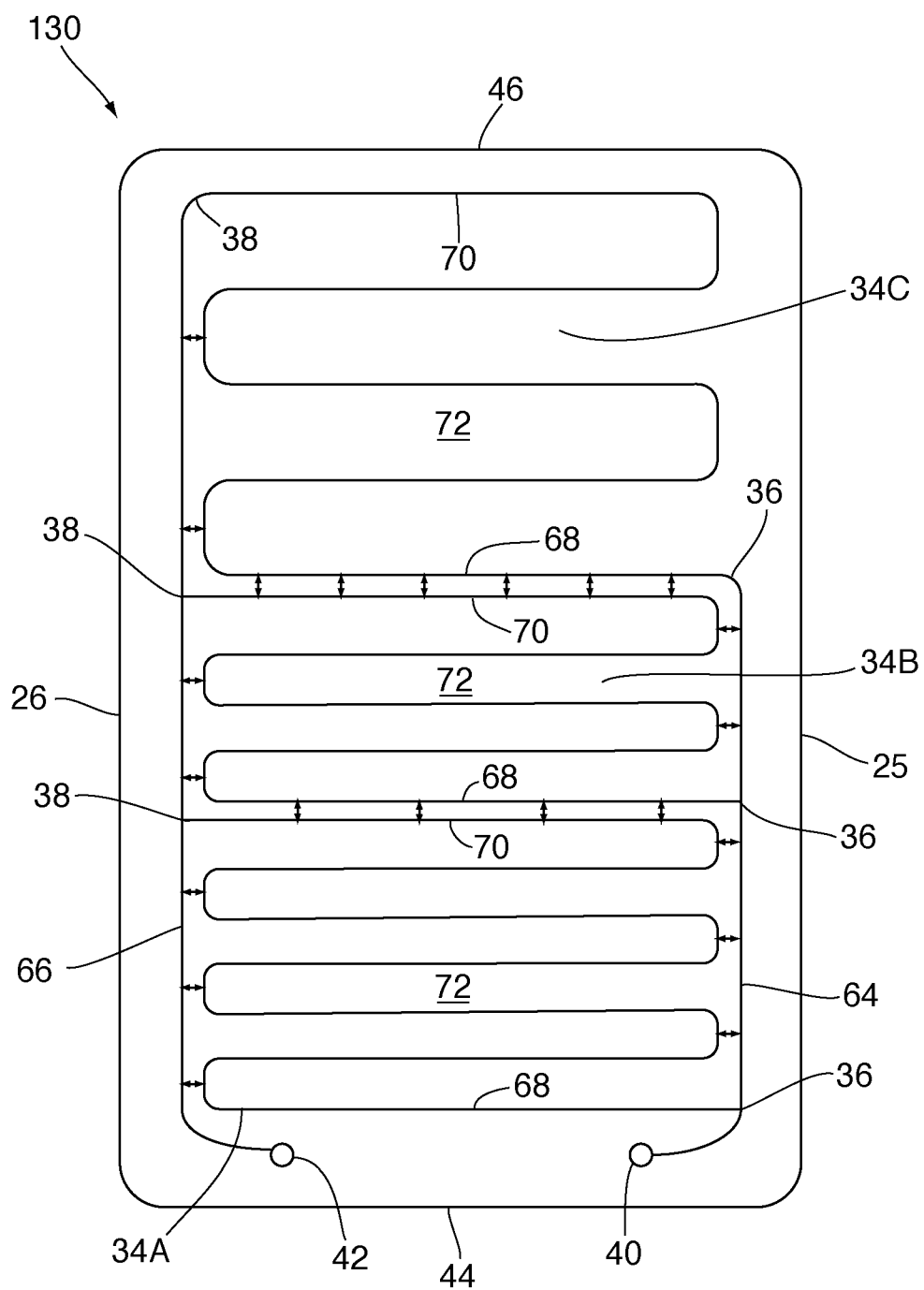
FIG. 10 is a schematic top plan view of a battery heat exchanger according to a fifth embodiment.

FIG. 10 schematically illustrates a heat exchanger 130 according to a fifth embodiment in which like elements are identified with like reference numerals in the drawings and the following description. Heat exchanger 120 includes three fluid flow passages 34 which are labelled 34A, 34B and 34C. The configuration of the fluid flow passages 34 is similar to that of heat exchanger 120, except that the intermediate flow channel 72 of each fluid flow passage 34 comprises a plurality of transverse convolutions comprising transversely extending channels with longitudinal end portions. As shown by the arrows in FIG. 10, there will be conductive heat transfer between adjacently located cross-flow channels 68, 70, and also between the longitudinal portions of intermediate flow channels 72 and the adjacent first and second fluid passages 64, 66. As in some of the embodiments described above, intermediate channels 72 in heat exchanger 130 have more convolutions, with more closely spaced channels in fluid flow passage 34A than in passages 34B and 34C; and has fewer convolutions and more widely spaced channels in fluid flow passage 34C than in passages 34A and 34B, for the purpose of balancing the pressure drops of the fluid flow passages 34A, 34B and 34C, to improve temperature uniformity across the surface area of heat exchanger 130.

As shown by the arrows in FIG. 10, there will be conductive heat transfer between adjacently located cross-flow channels 68, 70, and also between the longitudinal portions of intermediate flow channels 72 and the adjacent first and second fluid passages 64, 66. It will be appreciated that the portions of flow passages 64, 66, 68, 70, 72 between which conductive heat transfer occurs, as defined by arrows, are immediately adjacent to and in close proximity to each other, being separated from one another only by a single rib which partially defines a flow passage 64, 66, 68, 70, 72; the rib having a width which is less than a width of the flow passages 64, 66, 68, 70, 72 which it separates.

Although a number of the drawings specifically show areas in which conductive heat transfer takes place, it will be appreciated that conductive heat transfer may occur between two adjacent fluid flow passages or flow channels identified herein, provided that they are immediately adjacent to and in close proximity to one another, and provided that there is a sufficient temperature difference between the heat transfer fluid flowing through the passages or channels. For example, in heat exchanger 10 shown in FIGS. 1-6, there may be some conductive heat transfer between adjacent longitudinal portions 74 in the intermediate flow channels 72 of fluid flow passages 34. Similarly, there may be some conductive heat transfer between the bends 76 in the intermediate flow channels 72 and the adjacent cross-flow channels 68, 70 in any of the fluid flow passages 34. The same statements apply to heat exchangers 100 and 110 shown in FIGS. 7 and 8. In the heat exchangers 120, 130 shown in FIGS. 9 and 10, there may be conductive heat transfer between the transversely extending flow channels within the intermediate flow channels 72, and also between these transverse flow channels and the cross-flow channels 68 and/or 70. Also, in any of the embodiments described herein, there may be some conductive heat transfer between the inwardly and transversely extending portions of the first and second fluid passages 64 and/or 66, along first end edge 44, and the adjacent cross-flow channel 68 of fluid flow passage 34A.

FIGS. 11-15 schematically illustrate heat exchangers 140, 150 and 160 according to sixth, seventh and eighth embodiments in which like elements are identified with like reference numerals in the drawings and the following description. In each of heat exchangers 140, 150, 160, the first plate 12 and the first and second fittings 48, 50 are identical to those of heat exchanger 10. In each of heat exchangers 140, 150, 160, the second plate 18 of heat exchanger 140, 150, 160 is identical to second plate 18 of heat exchanger 10, except in the fluid flow passage 34A located proximate to end edge 44 at which the first and second ports 40, 42 are located, and in a first turbulized portion of the second fluid passage 66 extending along the side of fluid flow passage 34A, identified by number 142 in the drawings.

In each of heat exchangers 140, 150, 160, the total width of fluid flow passage 34A is slightly narrowed (along the x axis) relative to the corresponding fluid flow passage 34A in heat exchanger 10, wherein the total width of fluid flow passage 34A is defined as the combined widths of the longitudinal portions 74 of intermediate flow channel 72, and the combined widths of the longitudinal ribs separating the longitudinal portions 74. As a result, the first turbulized portion 142 of second fluid passage 66 extending along the side of fluid flow passage 34A may be widened along the x axis, such that it has a maximum width greater than the width of the portion of the second fluid passage 66 extending along the side of fluid flow passage 34B. This first turbulized portion 142 is located proximate to the second port 42 and includes an area in which a temperature of the heat exchanger reaches a minimum ($T_{min}$) or a maximum ($T_{max}$) during use of the heat exchanger 140, 150, 160. The fluid temperature in first turbulized portion 142 is at a minimum or maximum during use of the heat exchanger 140, 150, 160 due to the proximity of first turbulized portion 142 to the second port 42 and to the second ends 38 of the fluid flow passages 34. Modulating the fluid temperature in this first turbulized portion 142 of fluid outlet passage 66 will increase $T_{min}$ or reduce $T_{max}$, and thereby improve temperature uniformity of heat exchanger 140, 150, 160.

Figure 12:
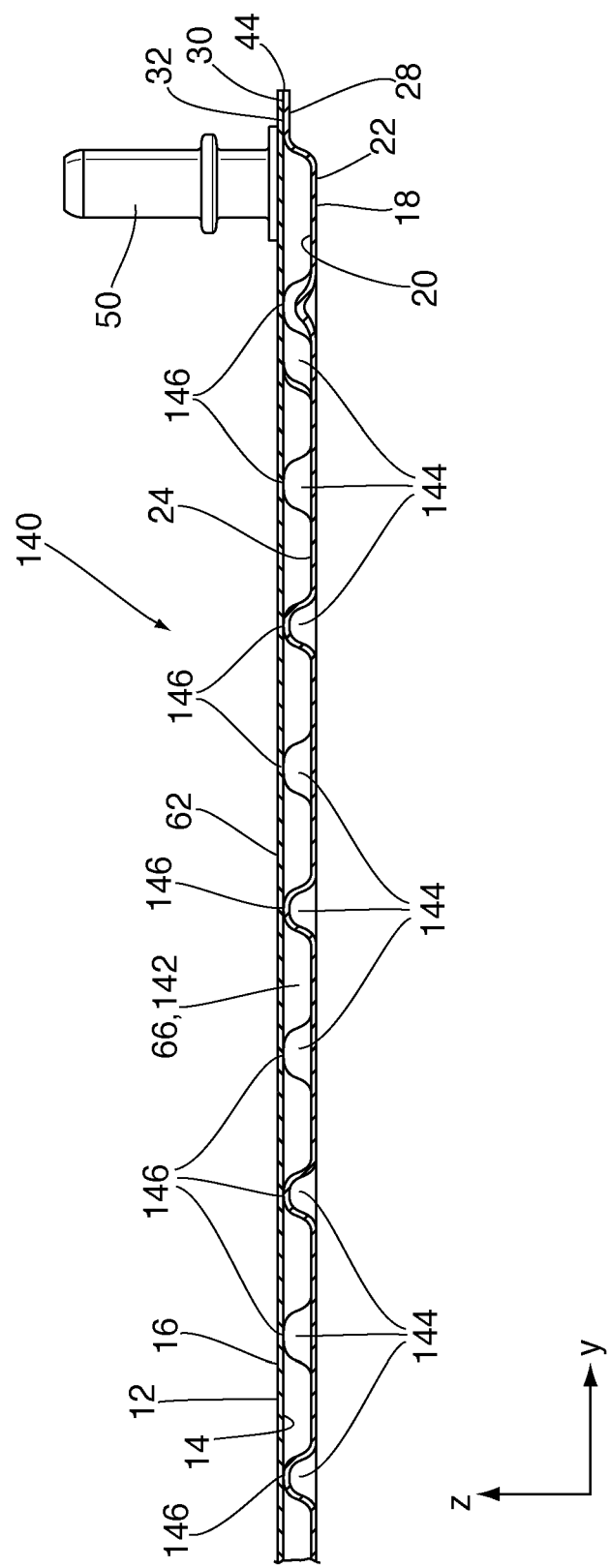
FIG. 12 is a longitudinal cross-section along line 12-12' of FIG. 11.
Figure 13:
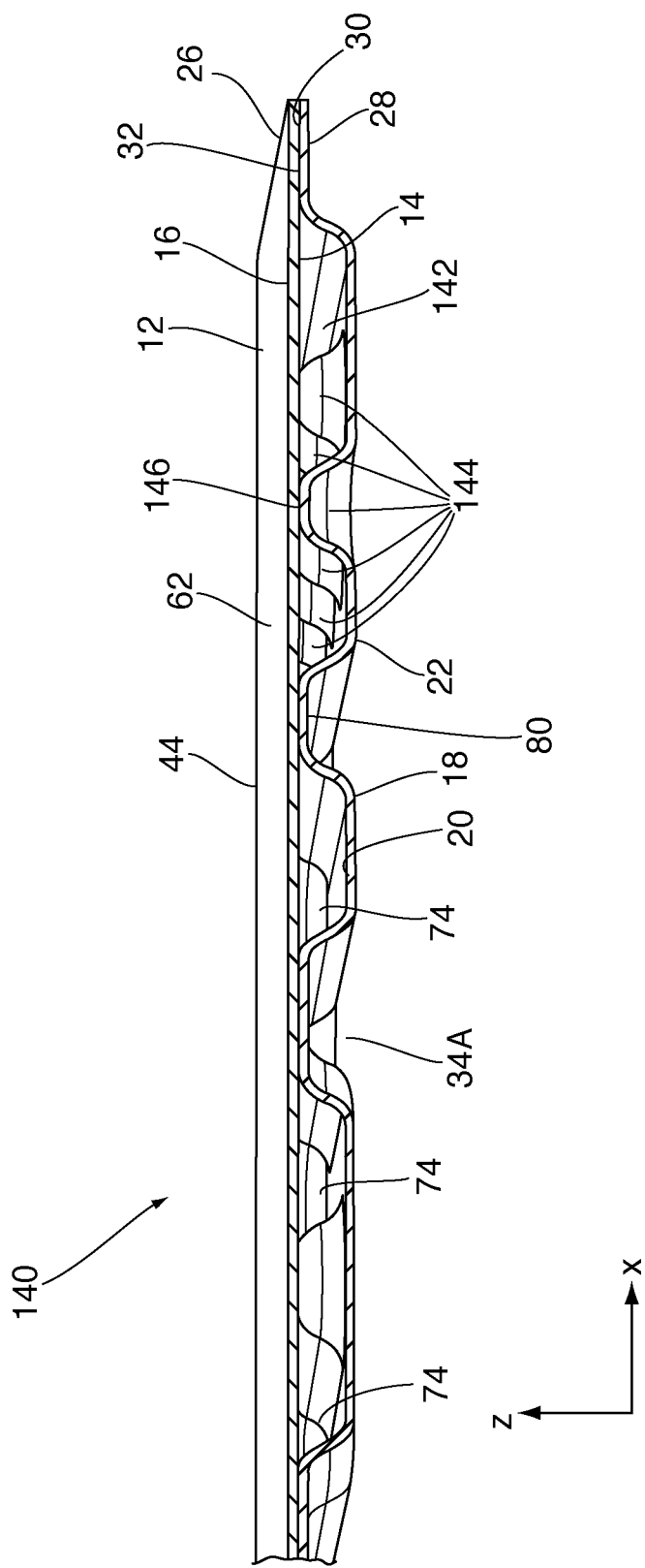
FIG. 13 is a transverse cross-section along line 13-13' of FIG. 11.

First turbulized portion 142 of second fluid passage 66 is provided with one or more flow obstructions 144 integrally formed with and extending upwardly from the central area 24 of second plate 18. As shown in FIGS. 12 and 13, each flow obstruction 144 has a flat or rounded sealing surface 146, the height of each flow obstruction 144 (along z axis) being sufficient that the sealing surface 146 of each flow obstruction 144 is substantially co-planar with the planar peripheral sealing surface 30 of second plate 18, such that the sealing surface 146 of each flow obstruction 144 may be sealingly joined to the inner surface 14 of first plate 12.

The one or more flow obstructions 144 are provided in first turbulized portion 142 in order to increase turbulence in the flow of the heat transfer fluid as it flows through first turbulized portion 142 toward or away from second port 42, and to break up the "boundary layers" which may form along the inner surfaces of the heat exchanger 140 which are in contact with the heat transfer fluid, such as the outer edges of the second fluid passage 66. As a result, the heat transfer coefficient is increased in first turbulized portion 142, which improves heat transfer and modulates the temperature in first turbulized portion 142, thereby improving temperature uniformity along the outer surface 16 of first plate 12 and/or the TIM.

One or more flow obstructions 144 can be located outside first turbulized portion 142 of second fluid passage 66 along fluid flow passage 34A. However, to achieve an optimal improvement in temperature uniformity while minimizing added pressure drop, at least some of the flow obstructions 144 are desirably located in first turbulized portion 142, which corresponds to a portion of heat exchanger 10 in which the temperature is at a maximum or minimum. Although flow obstructions 144 are described herein as being located inside first turbulized portion 142 of second fluid passage 66, it will be appreciated that one or more flow obstructions 144 may be located inside a corresponding portion of first fluid passage 64 extending along the side of fluid flow passage 34A, either instead of or in addition to the one or more flow obstructions 144 located in first turbulized portion 142 of second fluid passage 66.

The flow obstructions 144 may vary in shape, number and arrangement. For example, in the embodiments of FIGS. 11-15, the one or more flow obstructions 144 are in the form of a plurality of circular (in plan view) dimples, each having sloped sides which slope inwardly from the base toward a flat or rounded sealing surface.

It will be appreciated that the flow obstructions 144 are not necessarily identical to those shown in FIGS. 11-15. For example, the one or more flow obstructions 144 may comprise linear ribs, non-linear ribs or non-circular dimples, for example. Also, it is not strictly required in all embodiments that the top surfaces of the one or more flow obstructions 144 are sealed to and/or in contact with the inner surface 14 of first plate 12. Also, in some embodiments the one or more flow obstructions 144 are not necessarily integrally formed with the second plate 18. For example, in some embodiments, the one or more flow obstructions 144 may comprise a turbulence-enhancing insert such as a corrugated fin or a turbulizer in order to provide increased turbulence and surface area for heat transfer.

As used herein, the terms "fin" and "turbulizer" are intended to refer to corrugated turbulence-enhancing inserts having a plurality of ridges or crests connected by side walls, with the ridges being rounded or flat. As defined herein, a "fin" has continuous ridges whereas a "turbulizer" has ridges which are interrupted along their length to provide a tortuous flow path. Turbulizers are sometimes referred to as offset or lanced strip fins, and examples of such turbulizers are described in U.S. Pat. No. Re. 35,890 (So) and U.S. Pat. No. 6,273,183 (So et al.). The patents to So and So et al. are incorporated herein by reference in their entireties.

The flow obstructions 144 may be arranged in a staggered pattern as shown in FIGS. 11-13 and 15, to enhance the turbulizing effect of the flow obstructions 144. Alternatively, as shown in FIG. 14, the flow obstructions 144 may be aligned in a straight line, parallel to the y axis.

Figure 14:
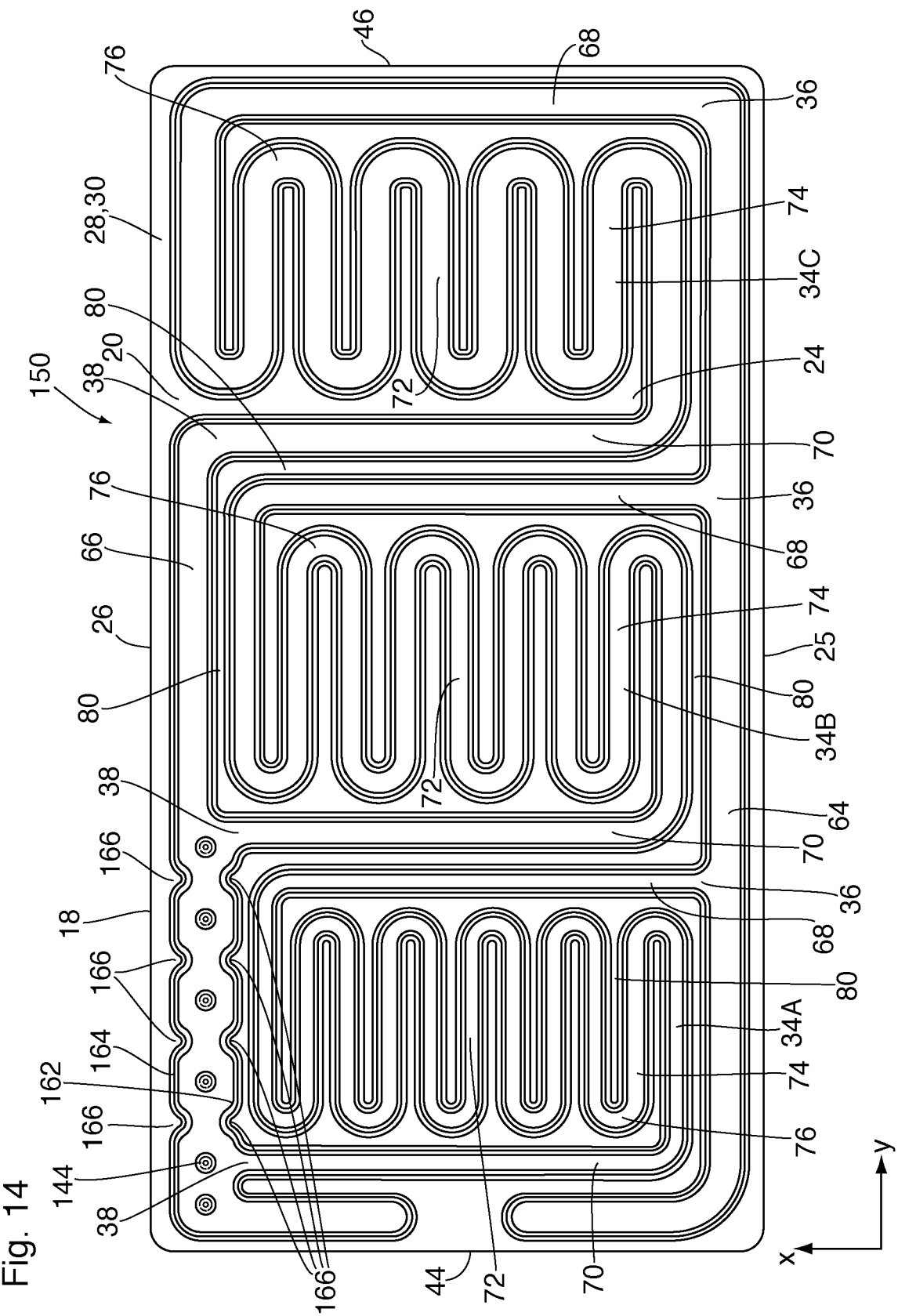
FIG. 14 is a top plan view of the bottom plate of a battery heat exchanger according to a seventh embodiment.
Figure 15:
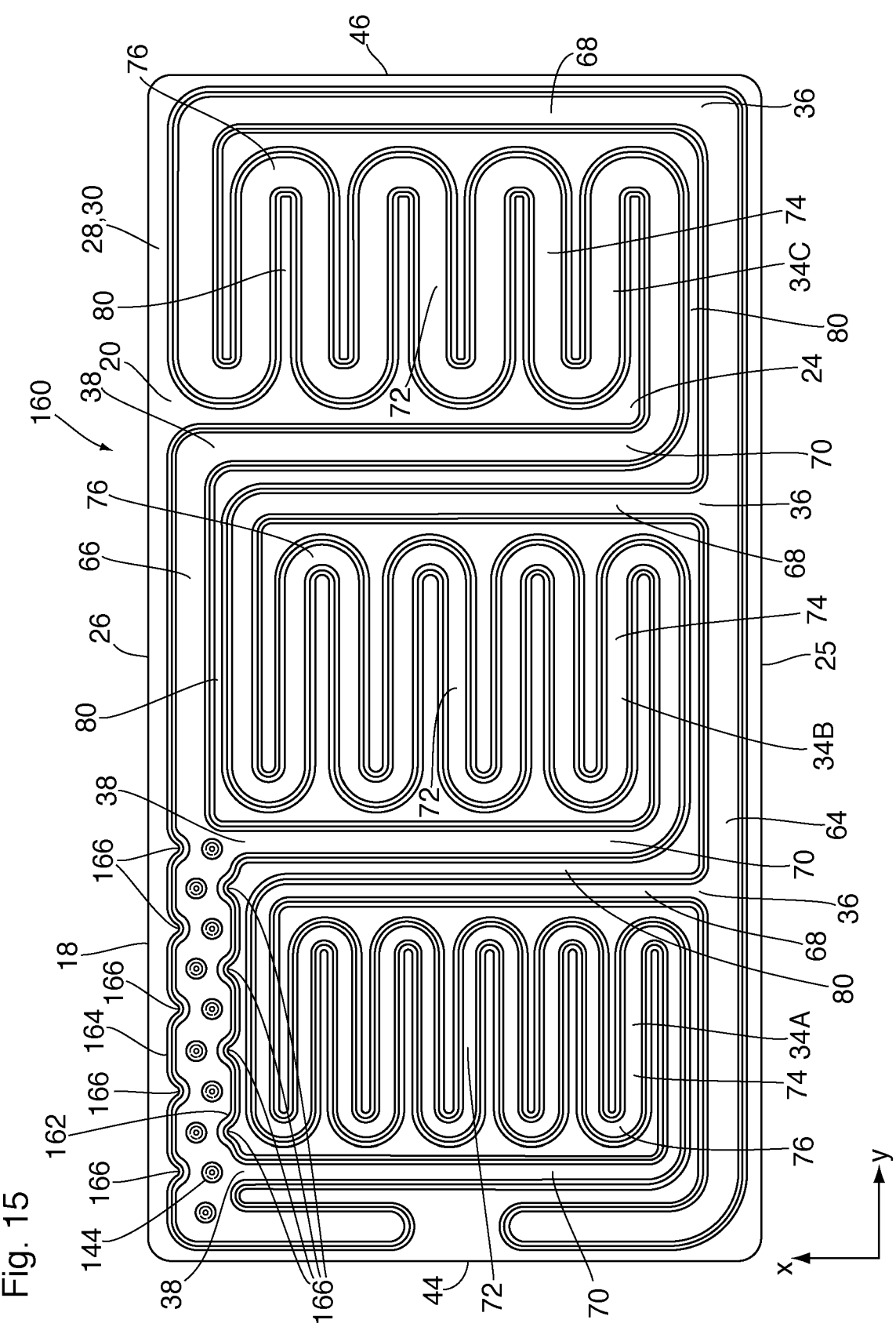
FIG. 15 is a top plan view of the bottom plate of a battery heat exchanger according to an eighth embodiment.

Furthermore, in heat exchangers 150, 160 shown in FIGS. 14 and 15, the inner wall 162 and/or the outer wall 164 of the second fluid passage 66, in first turbulized portion 142, are each provided with one or more irregularities in the form of turbulence-enhancing wall features 166. The inner wall 162 separates first turbulized portion 142 of second fluid passage 66 from fluid flow passage 34A and the outer wall 164 separates first turbulized portion 142 of second fluid passage 66 from planar flange 28. In the illustrated embodiment, each of the turbulence-enhancing wall features 166 comprises an inwardly-extending projection which extends from one of the respective walls 162, 164 into the second fluid passage 66.

Each of the turbulence-enhancing wall features 166 increases turbulence in the flow of the heat transfer fluid as it flows through first turbulized portion 142 toward or away from second port 42, and to break up the "boundary layers" as described above.

Where the turbulence-enhancing wall features 166 are in the form of inwardly-extending projections as in heat exchangers 150 and 160, they increase turbulence and break up boundary layers by providing local narrowing and/or widening of the second fluid passage 66. In the present embodiments, the turbulence-enhancing wall features 166 comprise rounded projections protruding inwardly from walls 162, 164, with a plurality of spaced-apart turbulence-enhancing wall features 166 being provided in each wall 162, 164 in first turbulized portion 142. The shape, number and spacing of the turbulence-enhancing wall features 166 provided in each wall 162, 164 is variable and not necessarily the same as that shown in FIGS. 14 and 15.

In the embodiment of FIG. 14, each of the turbulence-enhancing wall features 166 in the inner wall 162 directly opposes (along x axis) one of the turbulence-enhancing wall features 166 in the outer wall 164 and is staggered (along y axis) relative to each of the flow obstructions 144.

In the embodiment of FIG. 15, the turbulence-enhancing wall features 166 of the inner wall 162 are staggered (along y axis) relative to the turbulence-enhancing wall features 166 of the outer wall 164, and each of the turbulence-enhancing wall features 166 is directly opposed (i.e. aligned along x axis) to one of the flow obstructions 144.

Although turbulence-enhancing wall features 166 are described herein as being located inside first turbulized portion 142 of second fluid passage 66, it will be appreciated that one or more turbulence-enhancing wall features 166 may be located inside a corresponding portion of first fluid passage 64 extending along the side of fluid flow passage 34A, either instead of or in addition to the one or more turbulence-enhancing wall features 166 located in first turbulized portion 142 of second fluid passage 66.

A heat exchanger 170 according to a ninth embodiment is now described below with reference to FIGS. 16 to 18, in which like elements are identified with like reference numerals in the drawings and the following description.

In heat exchanger 170, the first plate 12 and the first and second fittings 48, 50 may be identical to that of heat exchanger 10. The second plate 18 of heat exchanger 170 is similar to the second plates 18 of heat exchangers 140, 150, 160, but differs therefrom in several respects, as described below.

Firstly, as shown, the pattern of fluid flow passages 34, 64 and 66 may be a mirror image of the patterns in heat exchangers 140, 150, 160 above. The second plate 18 of heat exchanger 170 includes a first turbulized portion 142 of the second fluid passage 66 extending along the side of fluid flow passage 34A which is closest to the ports 40, 42. In contrast to heat exchangers 140, 150, 160, the first turbulized portion 142 of heat exchanger 170 may have the same width (along the x axis) as other portions of the second fluid passage 66.

First turbulized portion 142 of second fluid passage 66 is provided with one or more flow obstructions 144 integrally formed with and extending upwardly from the central area 24 of second plate 18. As shown in FIG. 18, each flow obstruction 144 has a flat or rounded sealing surface 146, the height of each flow obstruction 144 (along z axis) being sufficient that the sealing surface 146 of each flow obstruction 144 is substantially co-planar with the planar peripheral sealing surface 30 of second plate 18, such that the sealing surface 146 of each flow obstruction 144 may be sealingly joined to the inner surface 14 of first plate 12.

The flow obstructions 144 in first turbulized portion 142 are arranged in a straight line, parallel to the y axis. Due to the relative narrowness of first turbulized portion 142 (in relation to first turbulized portions 142 in heat exchangers 140, 150, 160), the bases of the flow obstructions 144 may have a width (along x axis) which is the same as, or slightly less than, the width of first turbulized portion 142.

The second plate 18 of heat exchanger 170 also has a second turbulized portion 148, comprising the portion of first fluid passage 64 extending along the side of fluid flow passage 34A.

The second turbulized portion 148 of heat exchanger 170 has a configuration similar to the first turbulized portion 142 of heat exchanger 140. In this regard, the total width of fluid flow passage 34A is slightly narrowed (along the x axis) relative to the corresponding fluid flow passage 34A in heat exchanger 10, wherein the total width of fluid flow passage 34A is defined as the combined widths of the longitudinal portions 74 of intermediate flow channel 72, and the combined widths of the longitudinal ribs separating the longitudinal portions 74. As a result, the second turbulized portion 148 of first fluid passage 64 extending along the side of fluid flow passage 34A may be widened along the x axis, such that it has a maximum width greater than the width of the portion of the first fluid passage 66 extending along the side of fluid flow passage 34B. This second turbulized portion 148 is located proximate to the first port 40 and includes an area in which a temperature of the heat exchanger reaches a minimum ($T_{min}$) or a maximum ($T_{max}$) during use of the heat exchanger 170.

Figure 11:
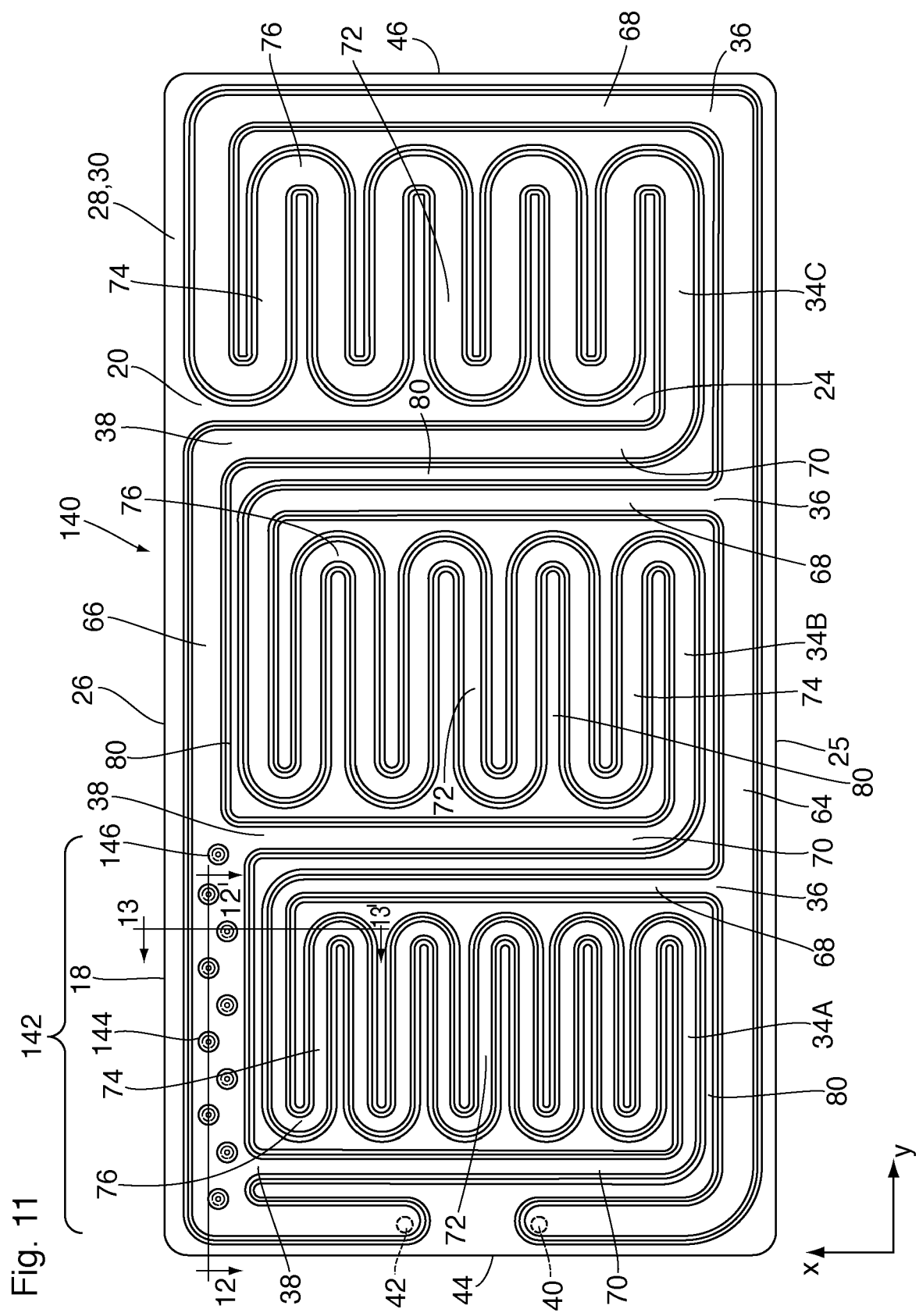
FIG. 11 is a top plan view of the bottom plate of a battery heat exchanger according to a sixth embodiment.

The second turbulized portion 148 of second fluid passage 66 is provided with one or more flow obstructions 144 integrally formed with and extending upwardly from the central area 24 of second plate 18, and which may be identical to the flow obstructions 144 in the first turbulized portion 142. The flow obstructions 144 of the second turbulized portion 148 may be arranged in a staggered pattern as shown in FIG. 11, to enhance the turbulizing effect of the flow obstructions 144.

Heat exchanger 170 is also provided with a plurality of support elements 172 which may comprise dimples having the same shape and dimensions as flow obstructions 144. These support elements 172 may be provided in unsupported areas of heat exchanger 170, such as the relatively wide first ends 36 of the fluid flow passages 34.

Thus, it can be seen that heat exchanger 170 includes first and second turbulized portions 142, 148 arranged alongside the fluid flow passage 34A which is closest to the first and second ports 40, 42. As mentioned above, the provision of flow obstructions 144 in areas of heat exchanger 170 in which the temperature is at a maximum or minimum, assists in achieving an optimal improvement in temperature uniformity while minimizing added pressure drop. In the present embodiment, the first port 40 may comprise the inlet port, and the second port 42 may comprise the outlet port, however, the flow direction can be reversed.

Figure 16:
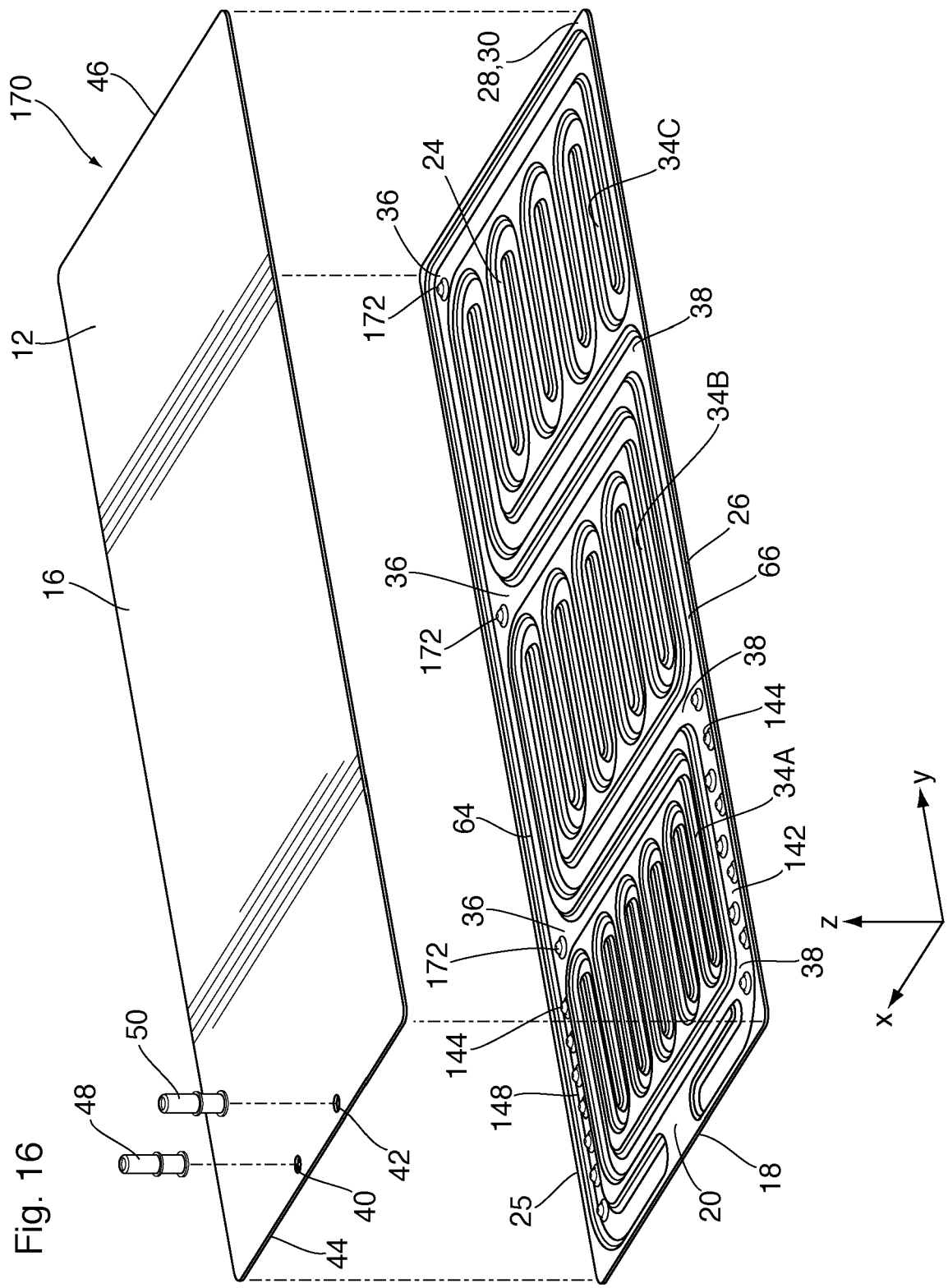
FIG. 16 is an exploded perspective view of a battery heat exchanger according to a ninth embodiment.
Figure 17:
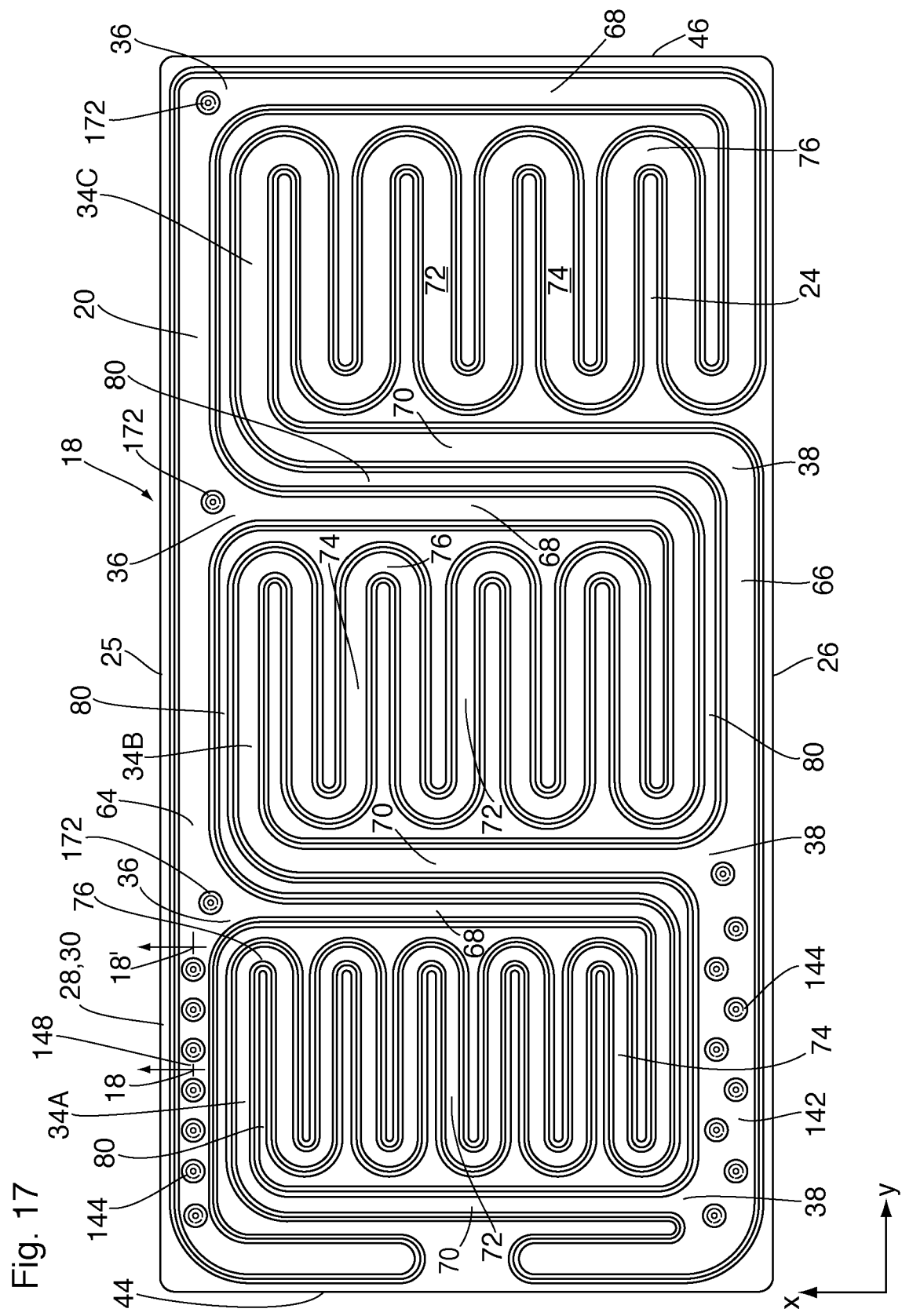
FIG. 17 is a top plan view of the bottom plate of the battery heat exchanger of FIG. 16.

The flow obstructions 144 and support elements 172 may vary in shape, number and arrangement from the specific arrangement shown in FIGS. 16-18. For example, the flow obstructions 144 and support elements 172 may comprise linear ribs, non-linear ribs or non-circular dimples, for example. Also, it is not strictly required in all embodiments that the top surfaces of the one or more flow obstructions 144 are sealed to and/or in contact with the inner surface 14 of first plate 12. Also, in some embodiments the flow obstructions 144 and support elements are not necessarily integrally formed with the second plate 18 and may instead comprise turbulence-enhancing inserts such as a corrugated fins or turbulizer, as discussed above.

It can be seen that the heat conduction pathways in heat exchangers 140, 150, 160, 170 are similar to those discussed above with reference to heat exchanger 10. For example, there will be conductive heat transfer between adjacently located cross-flow channels 68, 70, and also between the longitudinal portions 74 of intermediate flow channels 72 and the adjacent first and second fluid passages 64, 66. It will be appreciated that the portions of flow passages 64, 66, 68, 70, 74 between which conductive heat transfer occurs, are immediately adjacent to and in close proximity to each other, being separated from one another only by a single rib 80 which partially defines a flow passage 64, 66, 68, 70, 74; the rib 80 having a width which is less than a width of the flow passages 64, 66, 68, 70, 74 which it separates.

Although the heat exchangers described herein are cold plates, it will be appreciated that ICE plate heat exchangers are also within the scope of the present disclosure. In this regard, an ICE plate heat exchanger may be constructed from two mirror image shaped plates similar or identical to second plates 18 described above, and optionally having "side-entry" first and second fittings projecting from one of the edges of the heat exchanger.

While various embodiments have been described in connection with the present disclosure, it will be understood that certain adaptations and modifications of the described exemplary embodiments can be made as construed within the scope of the present disclosure. Therefore, the above discussed embodiments are considered to be illustrative and not restrictive.

What is claimed is:
1. A heat exchanger, comprising:
   (a) a first plate having an inner surface and an outer surface;
   (b) a second plate having an inner surface and an outer surface, wherein the first and second plates are joined together with their inner surfaces in opposed facing relation to one another, and with portions of the inner surfaces being spaced apart from one another;
   (c) a plurality of fluid flow passages adapted for flow of a heat transfer fluid, and located between the spaced apart portions of the inner surfaces of the first and second plates;

(d) an inlet port for supplying the heat transfer fluid to the plurality of fluid flow passages; and
(e) an outlet port for discharging the heat transfer fluid from the plurality of fluid flow passages;

wherein the inlet and outlet ports are located proximate to a first end of the heat exchanger, and the plurality of fluid flow passages are arranged along a longitudinal axis of the heat exchanger;

wherein each of the fluid flow passages comprises:
  (i) a first end through which the respective fluid flow passage communicates with the inlet port;
  (ii) a second end through which the respective fluid flow passage communicates with the outlet port;
  (iii) a first cross-flow channel extending transversely across the heat exchanger, wherein the first cross-flow channel is in flow communication with the inlet port through the first end of the respective fluid flow passage; and
  (iv) a second cross-flow channel extending transversely across the heat exchanger, wherein the second cross-flow channel is in flow communication with the outlet port through the second end of the respective fluid flow passage;

wherein the first and second cross-flow channels of each said fluid flow passage are spaced apart from one another along the longitudinal axis; and wherein each said fluid flow passage has at least one of:
  the first cross-flow channel located immediately adjacent to and in close proximity to the second cross-flow channel of an adjacent one of said fluid flow passages; and
  the second cross-flow channel located immediately adjacent to and in close proximity to the first cross-flow channel of an adjacent one of the fluid flow passages, wherein each of the fluid flow passages further comprises an intermediate flow channel which is in flow communication with the respective first and second cross-flow channels, and is adapted to receive heat transfer fluid from the respective first cross-flow channel and discharge the heat transfer fluid to the respective second cross-flow channel.

2. The heat exchanger according to claim 1, wherein the first and second cross-flow channels located immediately adjacent to and in close proximity to each other are separated by a distance which is less than a width of one of said first and second cross-flow channels.

3. The heat exchanger according to claim 1, wherein the first and second cross-flow channels located immediately adjacent to and in close proximity to each other are separated by a single rib which partially defines each of said first and second cross-flow channels; and
  wherein the rib has a width which is less than a width of one of said first and second cross-flow channels.

4. The heat exchanger according to claim 1, wherein the first and second cross-flow channels are straight and parallel to one another.

5. A heat exchanger, comprising:
  a first plate and a second plate;
  an inlet port for supplying a heat transfer fluid to a plurality of fluid flow passages and an outlet port for discharging the heat transfer fluid from the plurality of fluid flow passages; and
  the plurality of fluid flow passages located between inner surfaces of the first and second plates and the plurality of fluid flow passages arranged along a longitudinal axis of the heat exchanger, wherein each of the fluid flow passages comprises:
    a first cross-flow channel extending transversely across the heat exchanger, wherein the first cross-flow channel is in flow communication with the inlet port through a first end of the respective fluid flow passage; and
    a second cross-flow channel extending transversely across the heat exchanger, wherein the second cross-flow channel is in flow communication with the outlet port through a second end of the respective fluid flow passage, and the second cross-flow channel is spaced apart from the first cross-flow channel along the longitudinal axis;
    at least one of the first cross-flow channel and the second cross-flow channel positioned immediately adjacent to the other the first cross-flow channel and the second cross-flow channel of an adjacent one of the fluid flow passages; and
    an intermediate flow channel in flow communication with the respective first and second cross-flow channels, and is adapted to receive heat transfer fluid from the respective first cross-flow channel and discharge the heat transfer fluid to the respective second cross-flow channel.

6. The heat exchanger according to claim 5, wherein the intermediate flow channel of each said fluid flow passage occupies an area of the respective fluid flow passage.

7. The heat exchanger according to claim 5, wherein the heat exchanger further comprises a first side edge and a second side edge;
  wherein an overall direction of fluid flow through the intermediate flow channel of each said fluid flow passage is a first transverse direction, which is transverse to the longitudinal axis from the second side edge to the first side edge; and
  wherein a direction of fluid flow through the first and second cross-flow channels is a second transverse direction which is opposite to the first transverse direction.

8. The heat exchanger according to claim 5, wherein the intermediate flow channel of each said fluid flow passage comprises a plurality of convolutions which form a serpentine flow path.

9. The heat exchanger according to claim 8, wherein the plurality of convolutions of each said intermediate flow channel comprises a plurality of straight portions interconnected at their ends by a plurality of bends.

10. The heat exchanger according to claim 9, wherein the heat exchanger further comprises:
  a first side edge and a second side edge, with the inlet port being located proximate to the first side edge and the outlet port being located proximate to the second side edge;
  a fluid inlet passage which is in flow communication with the inlet port and the first end of each said fluid flow passage, wherein the fluid inlet passage extends along the first side edge; and
  a fluid outlet passage which is in flow communication with the outlet port and the second end of each said fluid flow passage, wherein the fluid outlet passage extends along the second side edge;
  wherein the plurality of straight portions of each said intermediate flow channel is parallel to the longitudinal axis and wherein each of the bends is a rounded, 180-degree hairpin bend; and wherein one of the straight portions of at least one of said intermediate channels is adjacent and in close proximity to the fluid inlet passage, and one of the straight portions of at least one of said intermediate channels is immediately adjacent to and in close proximity to the fluid outlet passage.

11. The heat exchanger according to claim 10, wherein said straight portion and said fluid outlet passage are separated by a distance which is less than a width of one of said straight portion and said fluid outlet passage.

12. The heat exchanger according to claim 10, wherein said straight portion and said fluid outlet passage are separated by a single rib which partially defines each of said first and second cross-flow channels; and wherein the rib has a width which is less than a width of one of said straight portion and said fluid outlet passage.

13. The heat exchanger according to claim 5, wherein one or more of the fluid flow passages comprises at least one feature to increase the pressure drop within said one or more fluid flow passages, wherein the at least one feature is selected from the group consisting of:

greater or smaller width of the first end and/or second end of the respective fluid flow passage, relative to one or more of the other fluid flow passages;

greater or smaller width of the first and/or second cross-flow channel, relative to one or more of the other fluid flow passages;

greater or smaller width of an intermediate flow channel, relative to one or more of the other fluid flow passages;

greater or smaller number of convolutions in the intermediate flow channel, relative to one or more of the other fluid flow passages;

greater or smaller longitudinal length relative to a length of one or more of the other fluid flow passages in the direction of the longitudinal axis; and greater or smaller transverse width relative to a width of one or more of the other fluid flow passages in the transverse direction.

14. The heat exchanger according to claim 13, wherein the heat exchanger has a pair of opposed, longitudinally extending side edges, and the heat exchanger further comprises:

a fluid inlet passage which is in flow communication with the inlet port and the first end of each said fluid flow passages, wherein the fluid inlet passage extends along a first one of the side edges of the heat exchanger; and a fluid outlet passage which is in flow communication with the outlet port and the second end of each said fluid flow passages, wherein the fluid outlet passage extends along a second one of the side edges of the heat exchanger.

15. The heat exchanger according to claim 14, wherein the first end of each said fluid flow passages comprises a branch opening of the fluid inlet passage, wherein the first ends of the fluid flow passages are spaced apart from one another along the longitudinal axis; and wherein the second end of each said fluid flow passages comprises a branch opening of the fluid outlet passage, wherein the second ends of the fluid flow passages are spaced apart from one another along the longitudinal axis.

16. The heat exchanger according to claim 15, wherein the first end of each said fluid flow passage has a width, and wherein the widths of the first ends become progressively larger with increasing distance from the first end of the heat exchanger.

17. The heat exchanger according to claim 15, wherein the second end of each said fluid flow passages has a width, and wherein the widths of the second ends become progressively larger with increasing distance from the first end of the heat exchanger.

18. The heat exchanger according to claim 14, wherein a portion of the fluid inlet passage located proximate to the inlet port includes an area in which a temperature of the heat exchanger reaches a minimum during use of the heat exchanger;

wherein a portion of the fluid outlet passage located proximate to the outlet port includes an area in which a temperature of the heat exchanger reaches a maximum during use of the heat exchanger; and wherein, at least one of:

the portion of the fluid outlet passage located proximate to the outlet port comprises a first turbulized portion which includes one or more flow obstructions to increase turbulence in the heat transfer fluid flowing through the first turbulized portion; and the portion of the fluid inlet passage located proximate to the inlet port comprises a second turbulized portion which includes one or more flow obstructions to increase turbulence in the heat transfer fluid flowing through the first turbulized portion.

19. The heat exchanger according to claim 18, wherein the one or more flow obstructions are selected from ribs, dimples, turbulizers and corrugated fins.

20. The heat exchanger according to claim 14, wherein at least one of the first and second turbulized portions includes one or more turbulence-enhancing wall features to increase turbulence in the heat transfer fluid flowing through said at least one of the first and second turbulized portions.

* * * * *